(12) United States Patent
Bertino

(10) Patent No.: US 10,356,982 B2
(45) Date of Patent: Jul. 23, 2019

(54) MODULAR PLATFORM FOR CUTTING SUGAR CANE

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 202 days.

(21) Appl. No.: 15/473,745

(22) Filed: Mar. 30, 2017

(65) Prior Publication Data
US 2017/0280626 A1    Oct. 5, 2017

(30) Foreign Application Priority Data

Apr. 1, 2016   (BR) .............................. 102016007269

(51) Int. Cl.
| | | |
|---|---|---|
| *A01D 45/10* | (2006.01) | |
| *A01D 75/28* | (2006.01) | |
| *A01D 34/416* | (2006.01) | |
| *A01D 63/02* | (2006.01) | |
| *A01D 101/00* | (2006.01) | |

(52) U.S. Cl.
CPC ........... *A01D 75/28* (2013.01); *A01D 34/416* (2013.01); *A01D 45/10* (2013.01); *A01D 63/02* (2013.01); *A01D 2101/00* (2013.01)

(58) Field of Classification Search
CPC ...... A01D 34/416; A01D 17/10; A01D 45/10; A01D 57/20; A01D 57/22; A01D 61/008; A01D 61/02; A01D 75/28; A01D 63/02; A01D 63/04

USPC ...... 56/15.3, 13.9, 62, 63, 153, 53; 171/105; 209/307; 198/698, 699, 834, 850; 460/70

See application file for complete search history.

(56) References Cited

U.S. PATENT DOCUMENTS

| | | | | |
|---|---|---|---|---|
| 9,788,489 | B2* | 10/2017 | Jager | A01D 45/10 |
| 2010/0307121 | A1* | 12/2010 | Marchini | A01D 75/28 |
| | | | | 56/63 |
| 2012/0043263 | A1* | 2/2012 | Kalverkamp | A01D 17/10 |
| | | | | 209/307 |
| 2014/0345431 | A1 | 11/2014 | Pierce | |
| 2015/0173298 | A1 | 6/2015 | Jager | |
| 2015/0359177 | A1* | 12/2015 | Richard | A01D 45/10 |
| | | | | 56/14.7 |

FOREIGN PATENT DOCUMENTS

| | | |
|---|---|---|
| BR | PI7604564 | 8/1977 |
| BR | PI7705347 | 5/1978 |
| BR | PI7802657 | 11/1978 |
| BR | PI7805303 | 5/1979 |
| BR | PI7801233 | 9/1979 |

(Continued)

*Primary Examiner* — Robert E Pezzuto
(74) *Attorney, Agent, or Firm* — B. Aaron Schulman, Esq.; Stites & Harbison, PLLC

(57) ABSTRACT

An agricultural harvesting machine for harvesting sugar cane, which can be coupled to a tractor or any self-propelling machine, by using mechanic power (TDP) converted into hydraulic power (pump) to activate different devices of a set so that it may form a wire cutting front for lanes of plants which are cut and thrown behind over the soil and organized in rows for later collecting and processing.

8 Claims, 22 Drawing Sheets

(56) References Cited

FOREIGN PATENT DOCUMENTS

| | | |
|---|---|---|
| BR | PI7805293 | 2/1980 |
| BR | PI7905902 | 5/1980 |
| BR | PI8006949 | 7/1982 |
| BR | PI8305505 | 2/1985 |
| BR | PI8406061 | 6/1986 |
| BR | PI8706619 | 11/1987 |
| BR | PI9500633 | 8/1997 |
| BR | PI9804182 | 3/2000 |
| BR | PI9904482 | 9/2000 |
| BR | PI0602115 | 1/2008 |
| BR | MU8801206 | 8/2009 |
| BR | PI0804386 | 7/2010 |
| BR | MU9000243 | 11/2011 |
| BR | 202014014292 | 2/2015 |
| BR | 202014014302 | 2/2015 |

* cited by examiner

MODULAR PLATFORM FOR CUTTING SUGAR CANE

FIELD OF THE INVENTION

The present invention relates generally to an implement used for agricultural harvesting and, more particularly, to an agricultural implement in the form of a wire cutting front for harvesting sugar cane, which cutting is performed at the time of harvest, next to the bases of the plants.

BACKGROUND OF THE INVENTION

Since the advent of the flex car, the sugar-alcohol field has benefited from a new cycle in sugar cane planting to produce fuel alcohol, not only as a substitute for petroleum due to the increase in international prices, but also for reasons related to climate change, since ethanol is an alternative renewable, less polluting energy source. Of the energy sources used, sugar cane has become an important energy matrix, overcoming hydraulic energy, just behind petroleum.

Not only has the consumption of fuel alcohol considerably increased sugar cane planting, but it has also increased the consumption of all other derivatives from such culture. Sugar, food and even its residues are used as an energy source, such as bagasse, which is used as fuel for boilers, cellulose production and feed for confined cattle.

Despite the economic benefits presented by the expansion of the sugar-alcohol field, environmental impacts caused by burning have been a cause for worry. For that reason, there are laws forbidding the burning of the plants at the harvesting stage. Said laws, despite not having a deadline to come into force, have become a tool enabling considerable changes in agricultural implements used for harvesting sugar cane without the stage of burning its leaves.

Considering the current state of the law and the targeting of small and medium producers of products derived from sugar cane, the industrial field of agricultural implements has concentrated efforts to develop new machines for harvesting sugar cane without burning, as previously done.

The state of the art offers a range of machines for this purpose, such as those taught by the documents: BR102014032269, BR112015031412, BR202014014302, BR202014014292, BR102014005942, BR102013016989, BR202013016074, BR202013013322, BR202013013145, BR102013010820, BR202012021829, BR202012020652, BR102012016510, BR102012013599, BR102012009691, BR102012007864, BR102012006658, BR112012031090, BR1107105, BR1107149, BR1106521, BR9101818, BR1102255, BR1003832, BR9000243, BR1000130, BR1000129, BR0905146, BR0905546, BR0902597, BR0901847, BR0900868, BR0900660, BR0924091, BR0803094, BR0804386, BR8801206, BR8800901, BR0800094, BR0718357, BR0709365, BR0603248, BR0601956, BR0602115, BR0602398, BR8600817, BR0505162, BR0504922, BR0505161, BR0504923, BR0504925, BR8400814, BR8400083, BR0302376, BR0201867, BR0106044, BR0105615, BR0105023, BR9904482, BR7900025, BR9802986, BR9702997, BR9704191, BR9704373, BR7502738, BR9500633, BR7500199, BR9400226, BR9303089, BR9303218, BR9204564, BR9204012, BR9206252, BR9102016, BR7100333, BR9001917, BR8903260, BR8706619, BR8703409, BR8406779, BR8406061, BR8401328, BR8304418, BR8204617, BR8202642, BR8202643, BR8006949, BR7805293, BR7905238, BR7901280, BR7805303, BR7802657, BR7705347, BR7702546, BR7700258, BR7607340, BR7604564, U.S. Pat. Nos. 6,510,679, 6,363,700, 6,272,820, 6,230,477, 6,226,969, 6,076,340, 5,724,797, 5,488,820, 5,485,716, 5,463,856, 5,379,577, 5,330,114, 5,303,533, 5,191,759, 5,157,904, 5,138,819, 5,131,216, 5,129,219, 5,092,110, 5,031,392, 4,924,662, 4,897,986, 4,783,952, 4,722,174, 4,646,512, 4,584,824, 4,574,567, 4,555,896, 4,550,552, 4,512,142, 4,483,130, 4,483,129, 4,471,602, 4,470,244, 4,443,999, 4,426,826, 4,408,441, 4,407,111, 4,295,325, 4,272,947, 4,270,337, 4,232,775, 4,196,569, 4,194,344, 4,173,110, 4,170,098, 4,165,596, 4,154,047, 4,152,883, 4,099,365, 4,098,060, 4,070,809, 4,065,912, 4,035,996, 4,019,308, 3,952,482, 3,950,924, 3,942,307, ES440418, DE2,536,333, GB1,427,930, GB1,424,511 and AU2,060,976.

The field of harvesting machines for sugar cane is extremely variable, including different solutions for small, medium-sized and large farmers. There are implements just to cut plants, others to cut and remove leaves, others that add complements to cut the plants into billets and others with resources to process residual straw. While there are many variations, one preponderant detail of said implements, whether they be large, medium-sized or small, is the fact that they perform cutting by rotating knives.

Implements intended just for cutting are usually considerably troublesome and, in addition to using rotating cutting knives, they have not been specifically developed for small, medium-sized and large producers.

SUMMARY OF THE INVENTION

The present invention seeks to provide an agricultural machine with a wire cutting system eliminating traditional rotating knives and with means for the set to be used in two different ways:

a. the simplest way is by its direct coupling to a usual tractor, by using its mechanic power (TDP) converted into hydraulic power (pump) to activate different devices of the set, so that it may form a wire cutting front for at least two lanes of plants which are cut and thrown behind on the soil and organized in rows for later collecting and processing; and b. the second option for use of the set is more complete, wherein the same means above allow for coupling the set to any self-propelled machine, also known as automotive, which characteristics vary, but usually adds devices for receiving and processing cut canes as collected by the platform, performing at least three processing stages, namely fragmentation in billets (chopping), leaf removal (cleaning) and moving billets to pack them for appropriate transshipment or for any kind of cargo and transport vessel.

The present invention seeks to provide an implement of the type having all its moving parts activated by hydraulic engines, having as a source of activation a usual hydraulic pump jointly working with and usually fixed to said tractor or self-propeller for processing the harvested cane.

The present invention also seeks to provide a cutting system substituting traditional knives with just a special steel cable being the continuous cutting wire moved by pulleys, extending itself over the whole width of the platform, where it forms a substantially more efficient cutting system in comparison with the knives.

Lastly, the present invention seeks to provide means for the set to become modular, thus allowing its configuration to work with a cutting front that can cover one, two or more planting lanes. Said versatility is been possible as a function of the core structure of the set, which may grow modularly in its width, and consequently the whole set may be sized to cut one, two or more planting lanes.

BRIEF DESCRIPTION OF THE DRAWINGS

For a better understanding of the present invention, a detailed description is subsequently presented with reference to the attached drawings.

DETAILED DESCRIPTION OF THE INVENTION

Figure 1:
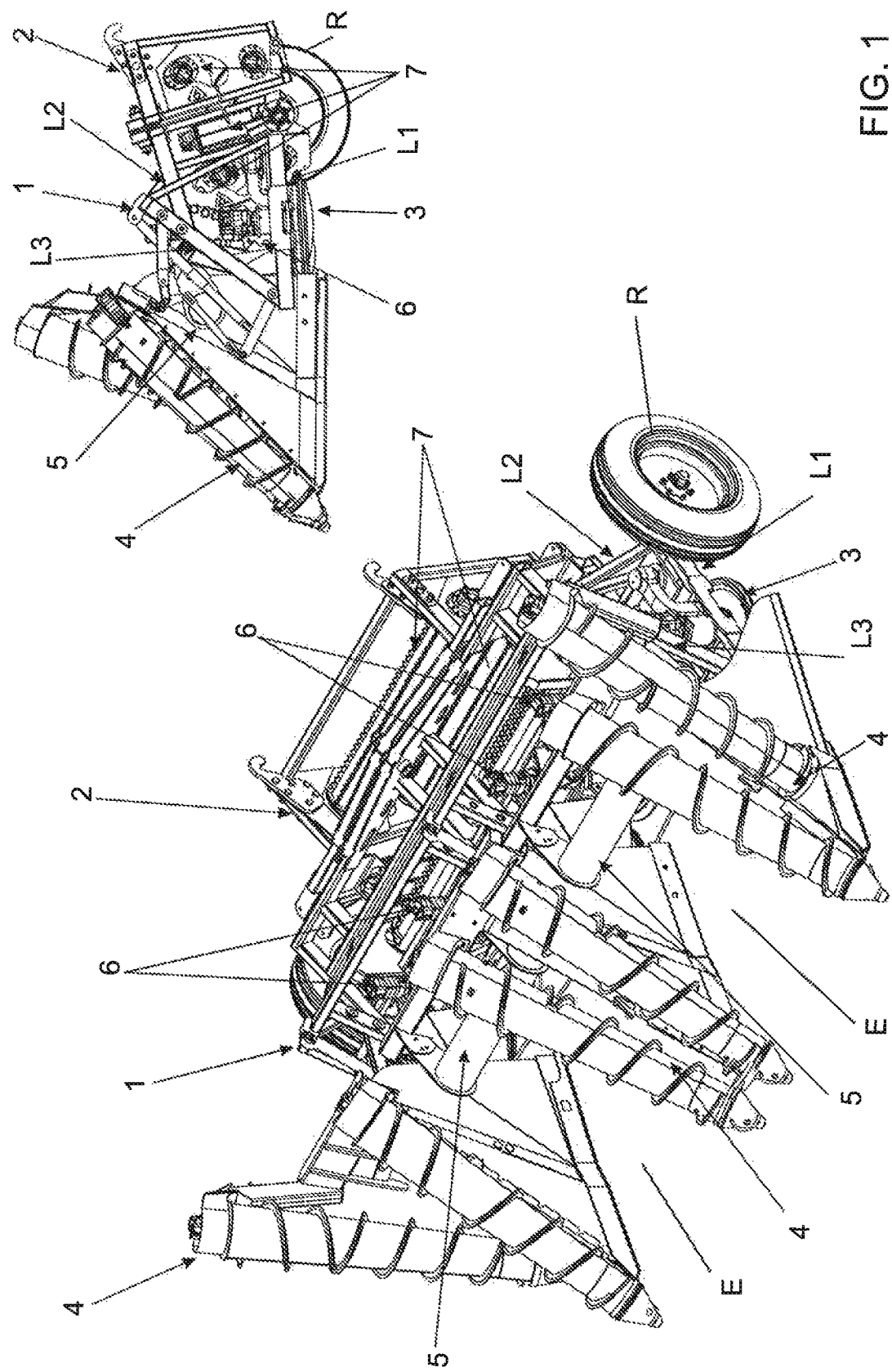
FIG. 1 shows, respectively, an isometric view and a side view of the full platform.
Figure 2:
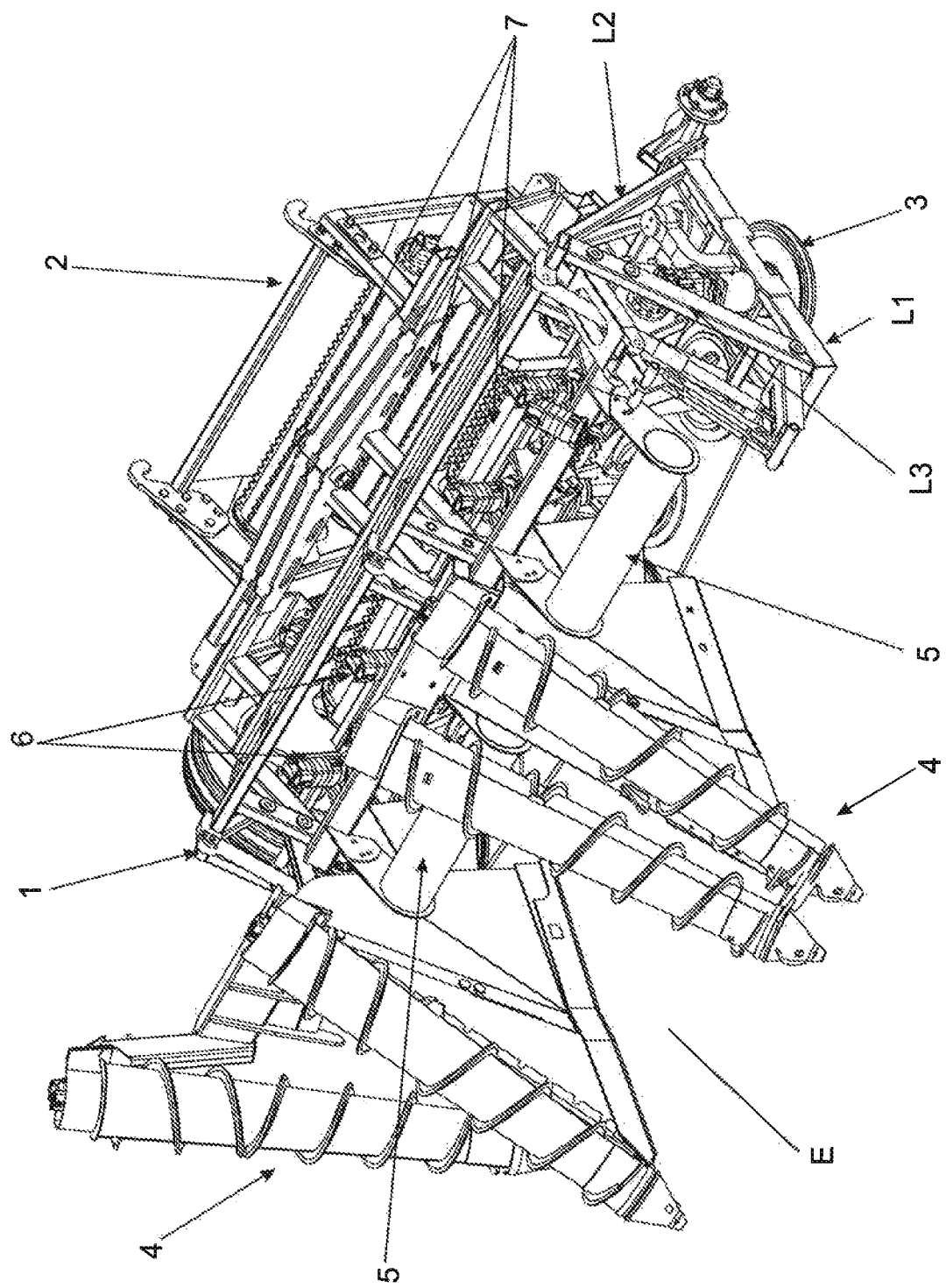
FIG. 2 shows another isometric view, but without one of the usual lane dividers for visualization of one of the guiding sets tilting the plants before they are cut.
Figure 3:
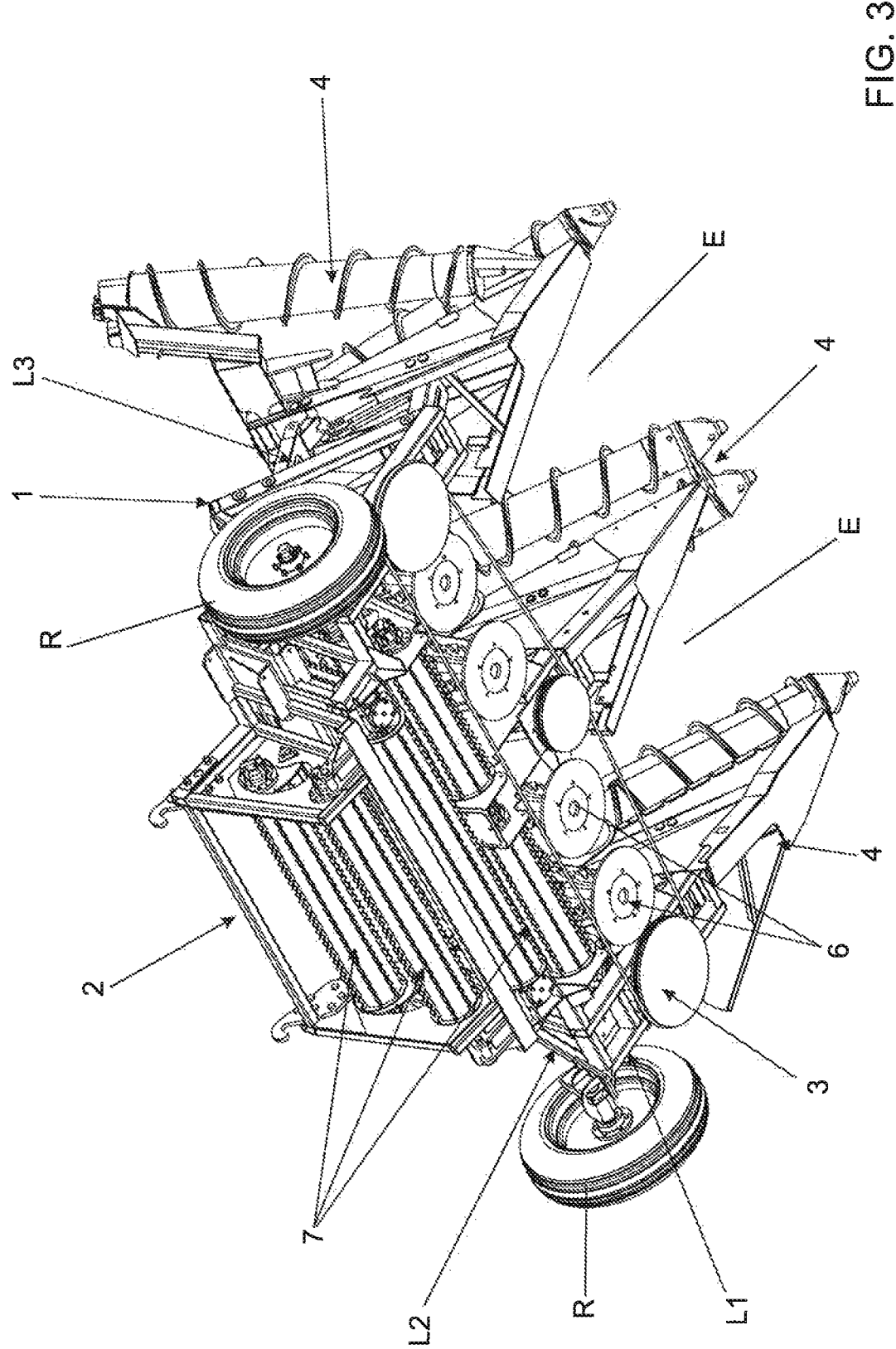
FIG. 3 shows a perspective view showing the platform from a rear lower angle, highlighting the wire cutting device.
Figure 4:
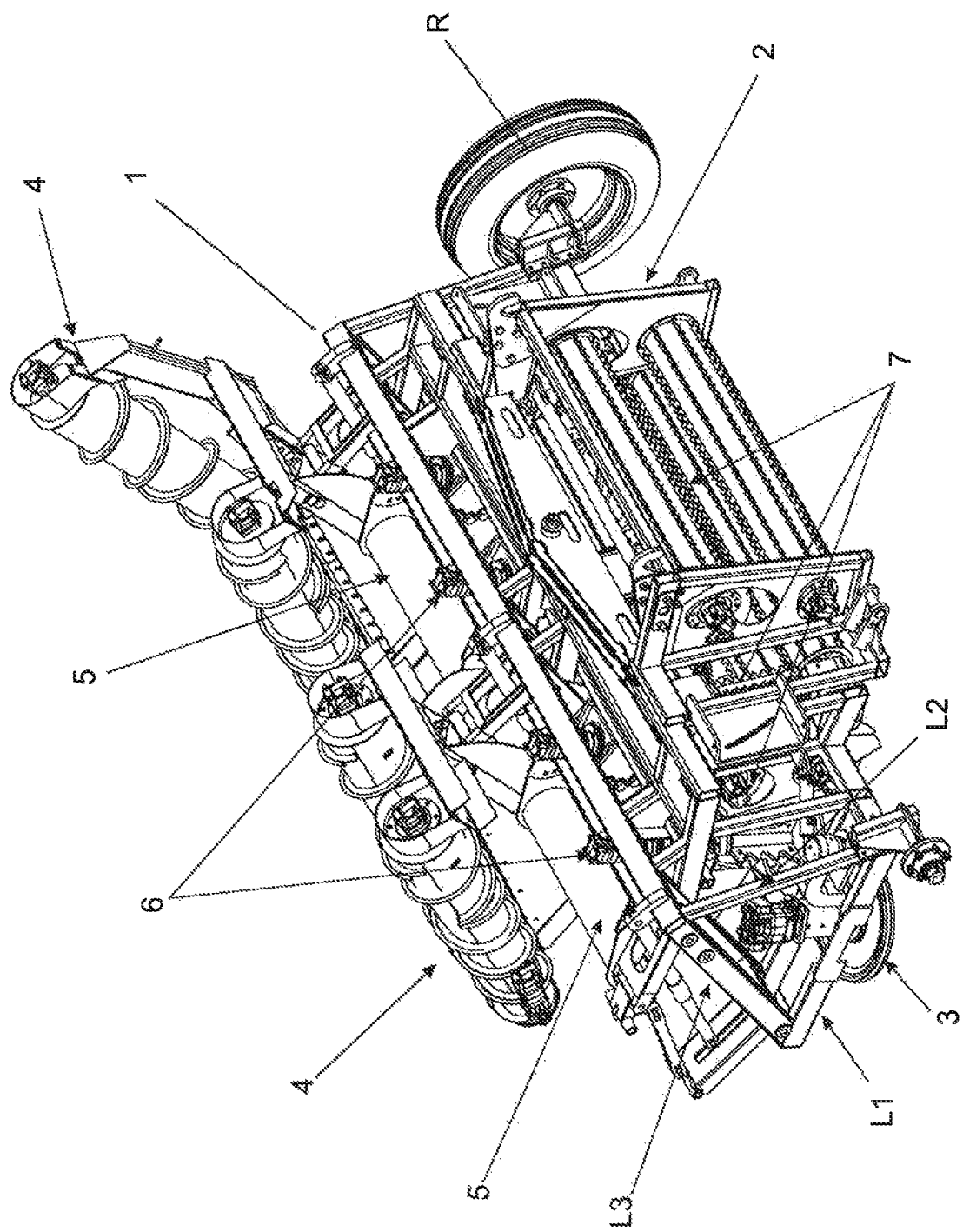
FIG. 4 is a perspective view showing the platform from a rear upper angle without one of the wheel sets, highlighting the pulling devices for cut plants.

According to these illustrations and their details, more particularly FIGS. 1 to 4, the present invention, a modular platform for cutting sugar cane, comprises the following characteristics:

a modular structure (1) extending throughout the width of the set and, seen on its side, presenting triangular geometry, having a lower horizontal side and an apex oriented upwards, forming three distinct assembly planes, being a lower and horizontal assembly plane (L1), a sloped rear assembly plane (L2) and a sloped front assembly plane (L3);

on each external side of the modular structure (1) and next to its rear corner, usual wheels (R) are assembled;

on the sloped rear assembly plane (L2), a mouth structure (2) is added, receiving coupling means for the set with the corresponding parts of a usual tractor or a usual self-propeller (not shown);

the modular structure (1) reciprocates, and is hinged to the mouth structure (2), the latter being solidary to the tractor or self-propeller and granting to the first one a pendulum movement following slopes and inclinations on the soil;

under the lower and horizontal assembly plane (L1) of the modular structure (1), the cutting wire device (3) is assembled, forming a horizontal cutting line extending throughout the width of the modular structure (1);

on the sloped front assembly plane (L3) of the modular structure (1), usual lane dividers (4) are located, being one in the middle and two at the edges, between which inlet spaces (E) are formed for each lane of plants to be cut;

between usual lane dividers (4), guiding sets (5) for the canes in the cutting process are assembled; and behind the guiding sets (5), vertical pulling sets (6) and horizontal pulling sets (7) for the cut plants are located.

Therefore, the platform is coupled to a tractor or self-propeller by means of its mouth structure (2), and the whole device is displaced against two planting lanes, one lane for each inlet gap (E). In this configuration, the plants are reached by the usual lane dividers (4), which are rotating helical rollers turning in such a direction to separate interlaced canes between one lane and the other, allowing only the canes from the lane to be cut to be correctly guided towards the inlet gap (E) against the corresponding guiding sets (5) which, even before the cut, allow the plants to be sloped at a given angle, at which time the wire cutting device (3) cuts the bases of the plants to cut them down. At that moment, the edge of the cut plants is already directed to inside the platform, where it is pulled inside by the vertical pulling sets (6) and horizontal pulling sets (7). When the platform is operated on a usual tractor, cut plants are thrown behind and prepared in rows for later collection. If the set is coupled to a self-propeller, it receives the canes and performs other processing steps, such as chopping them into billets and cleaning (removal of leaves and other disposable parts).

Figure 5:
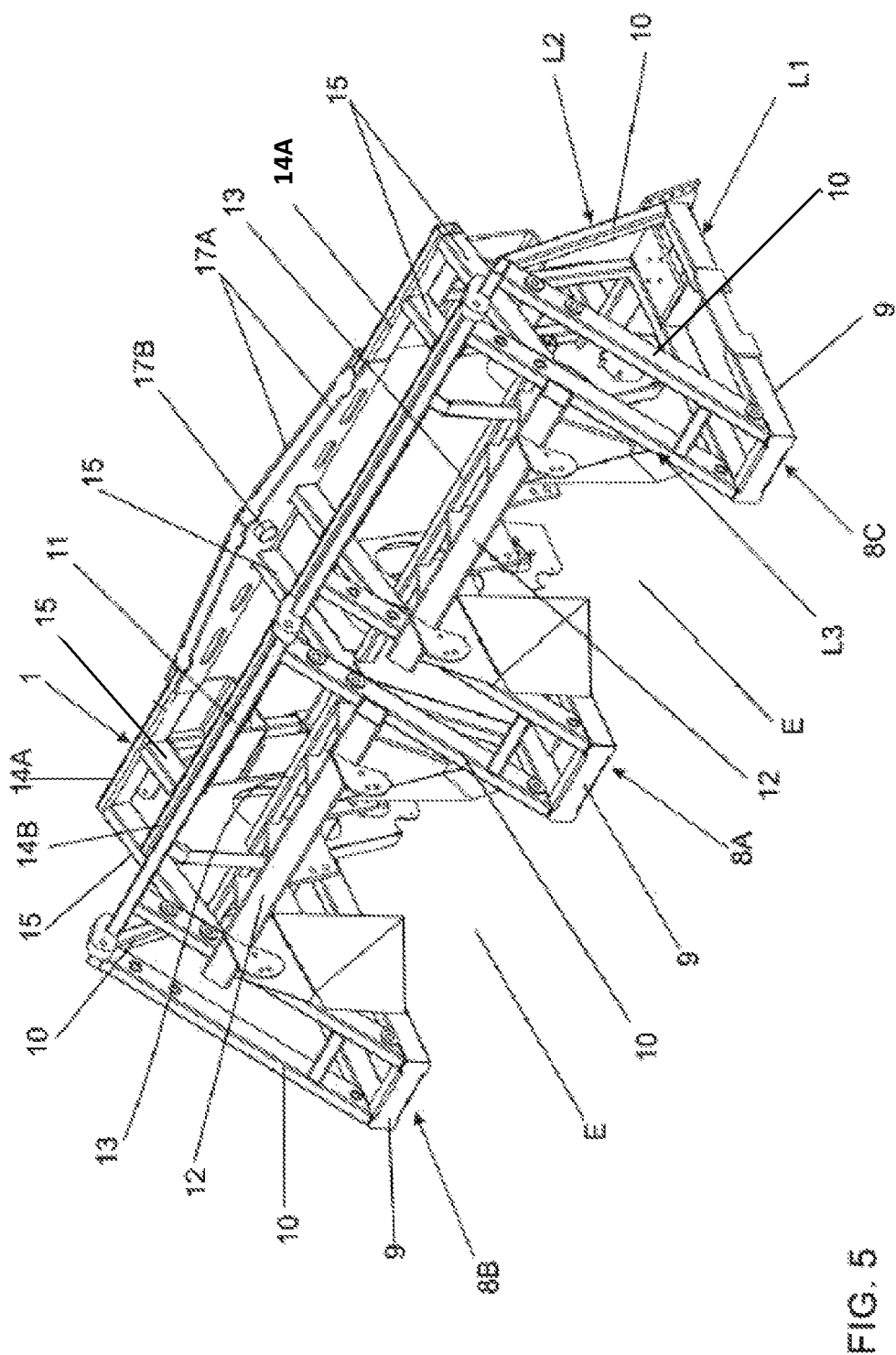
FIG. 5 shows a perspective view showing only the modular structure of the platform from a front upper angle.
Figure 6:
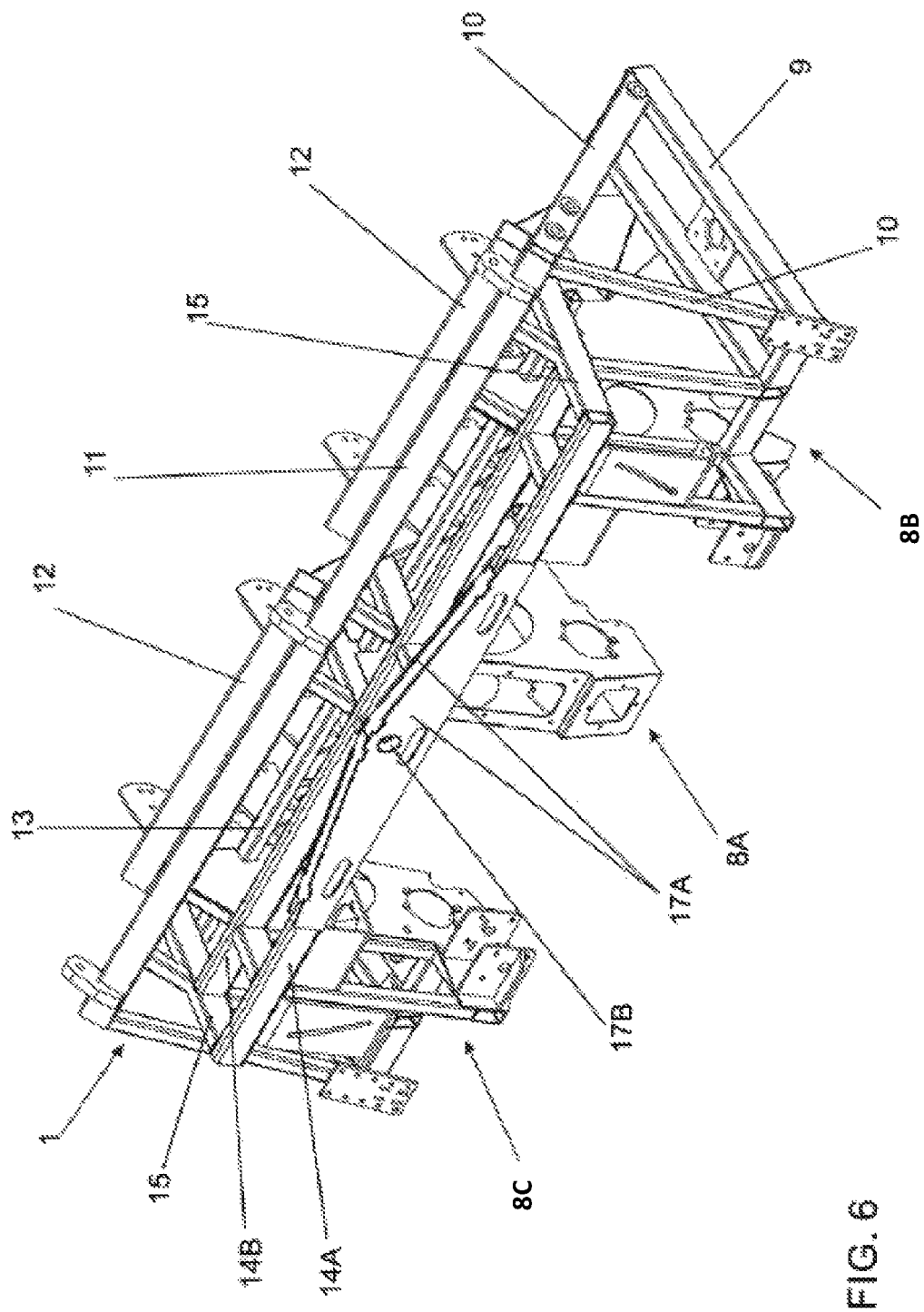
FIG. 6 also shows a perspective view of only the modular structure of the platform, but from a rear upper angle.

The modular structure (1), shown in detail in FIGS. 5 and 6, comprises three structural cases, including an intermediate structural case (8A), a right structural case (8B) and a left structural case (8C), all of them with the same geometry of a triangular prism, with bases in the form of rectangular frames (9) forming the lower horizontal assembly plane (L1). The sloped assembly planes (L2) and (L3) are defined by other rectangular frames (10), these having their upper edges joined with a top crossbar (11) forming the apex of said modular structure (1), with other similar segmented crossbar-shaped links (12) and (13) below said top crossbar (11), configuring fixing points for a rear extension defined by two beams (14A) and (14B) which are parallel to one another and to the crossbar (13), and which are linked by various perpendicular supports (15). The crossbar (14A) is interleaved in the middle between reinforcement plates (17A) pierced by a short central tube configuring a hinged coupling point (17B) with the mouth structure (2).

Figure 7:
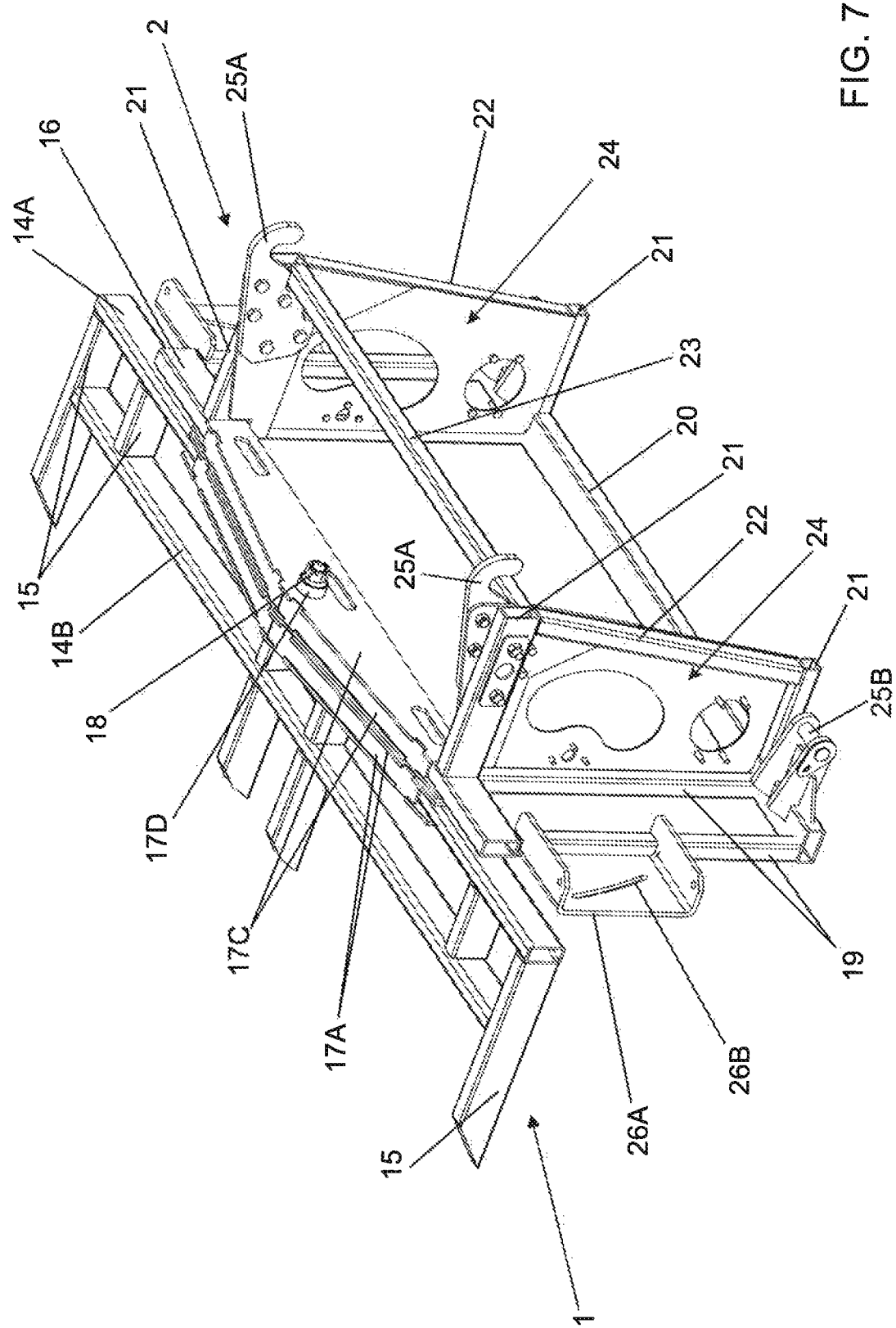
FIG. 7 is a perspective view from a rear upper angle showing a rear part of the modular structure, where the mouth structure for coupling the platform is hinged to the tractor or self-propeller.
Figure 8:
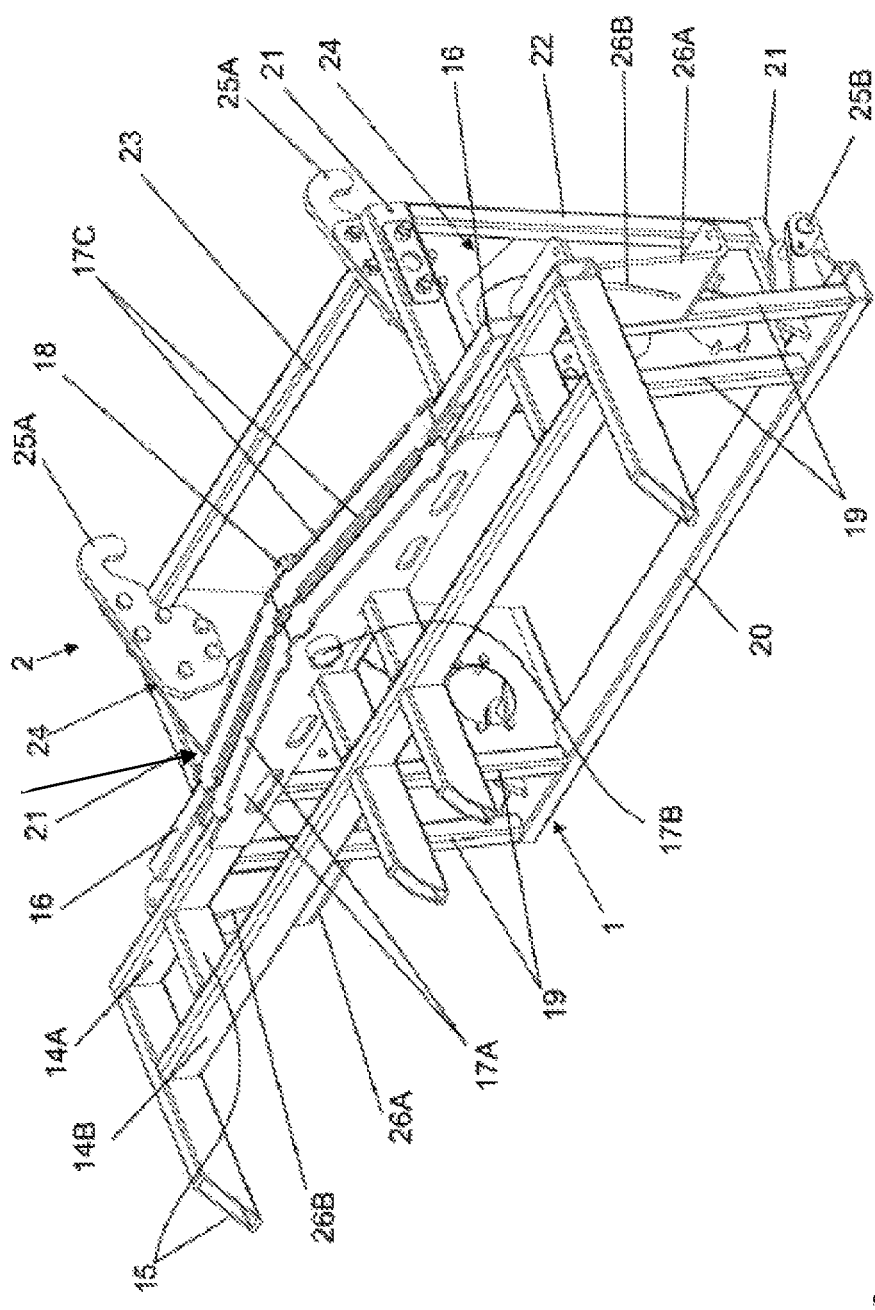
FIG. 8 shows the same arrangement, but from a front upper angle, highlighting the mouth structure for coupling the platform to the tractor or self-propeller.
Figure 9:
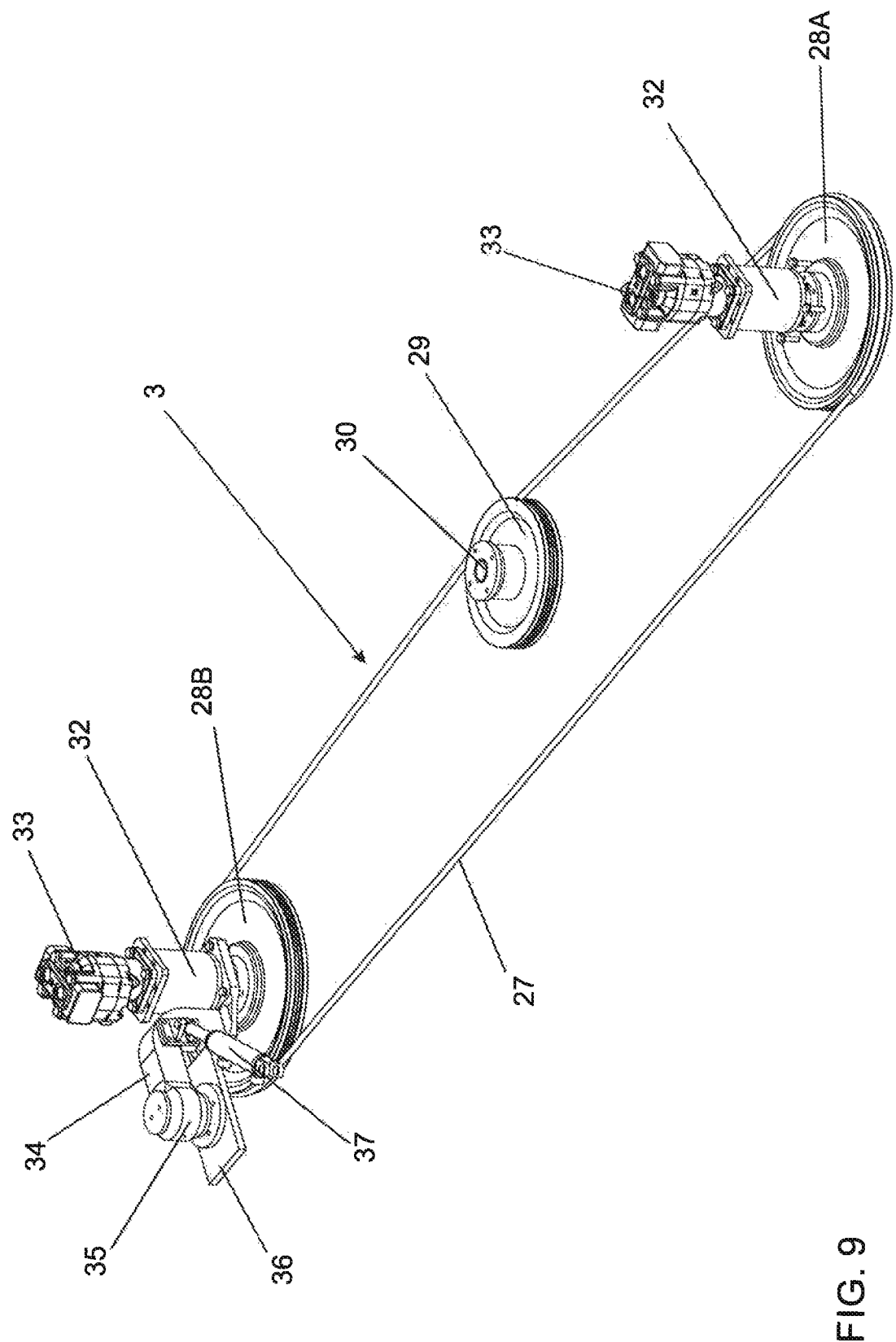
FIG. 9 shows a perspective view just of the wire cutting set.
Figure 10:
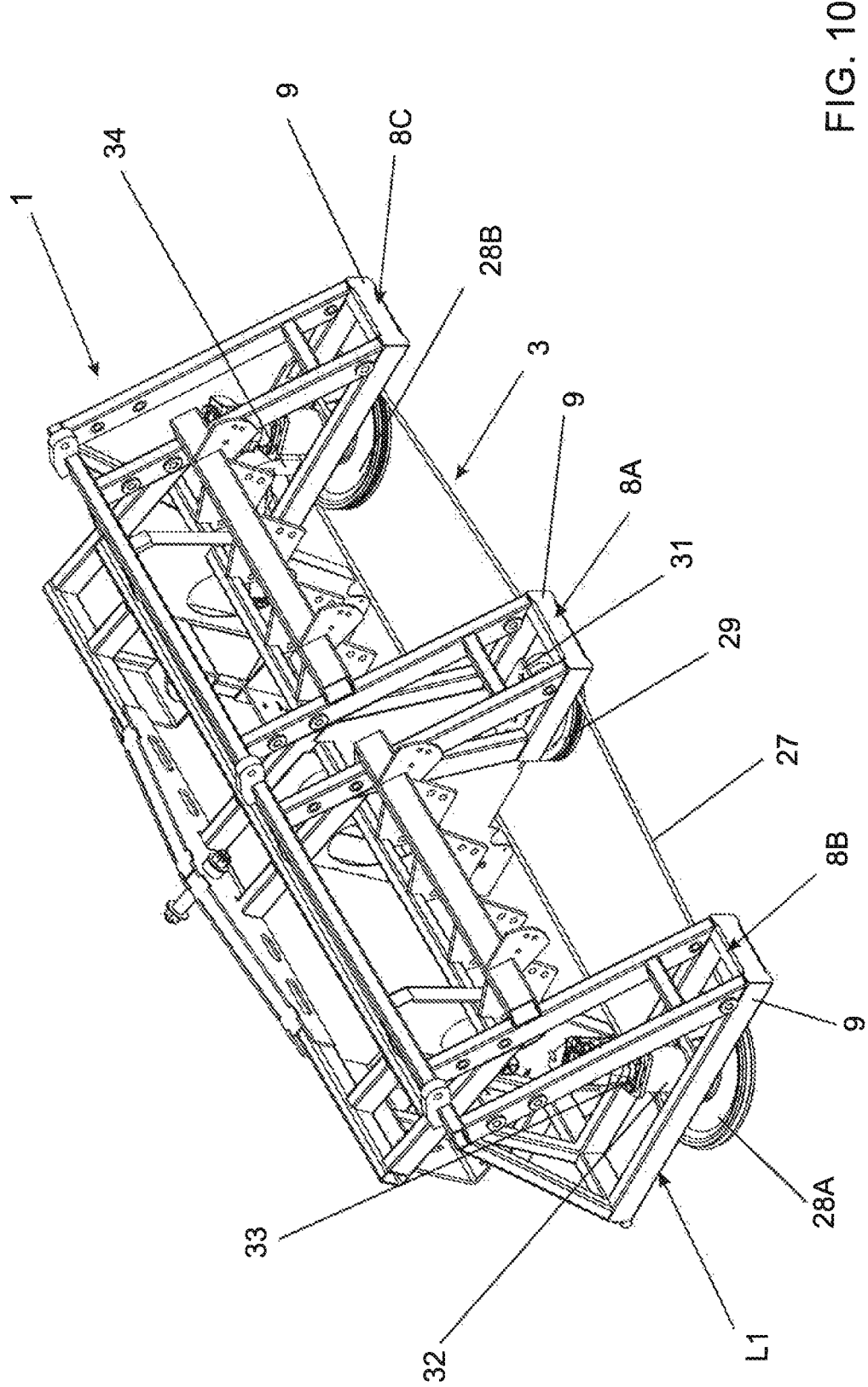
FIG. 10 shows a perspective view just of the modular structure with the wire cutting set, highlighting its assembly to the lower part of said structure.
Figure 11:
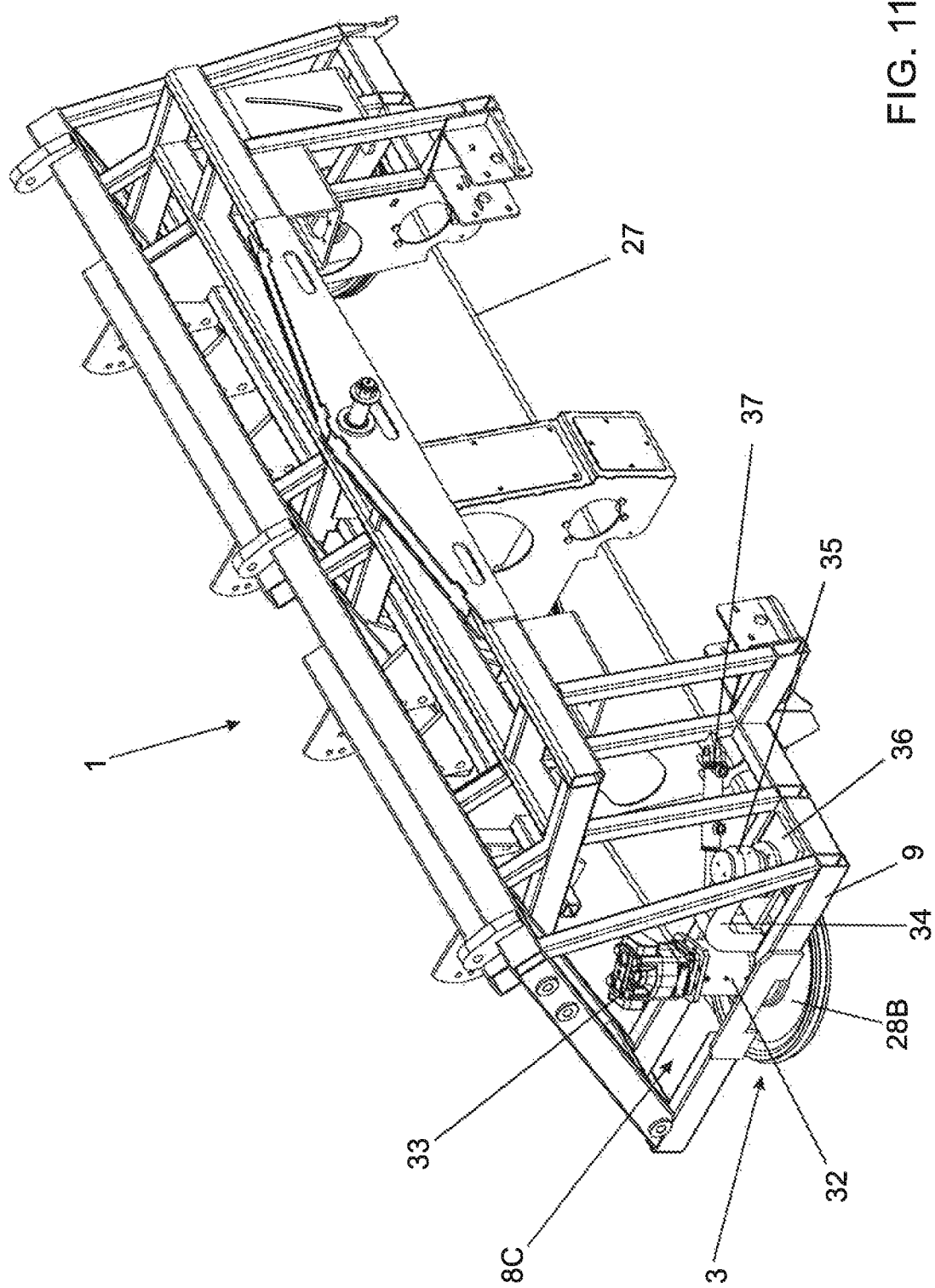
FIG. 11 shows another perspective view just of the modular structure with the wire cutting set, but from a rear upper angle.
Figure 12:
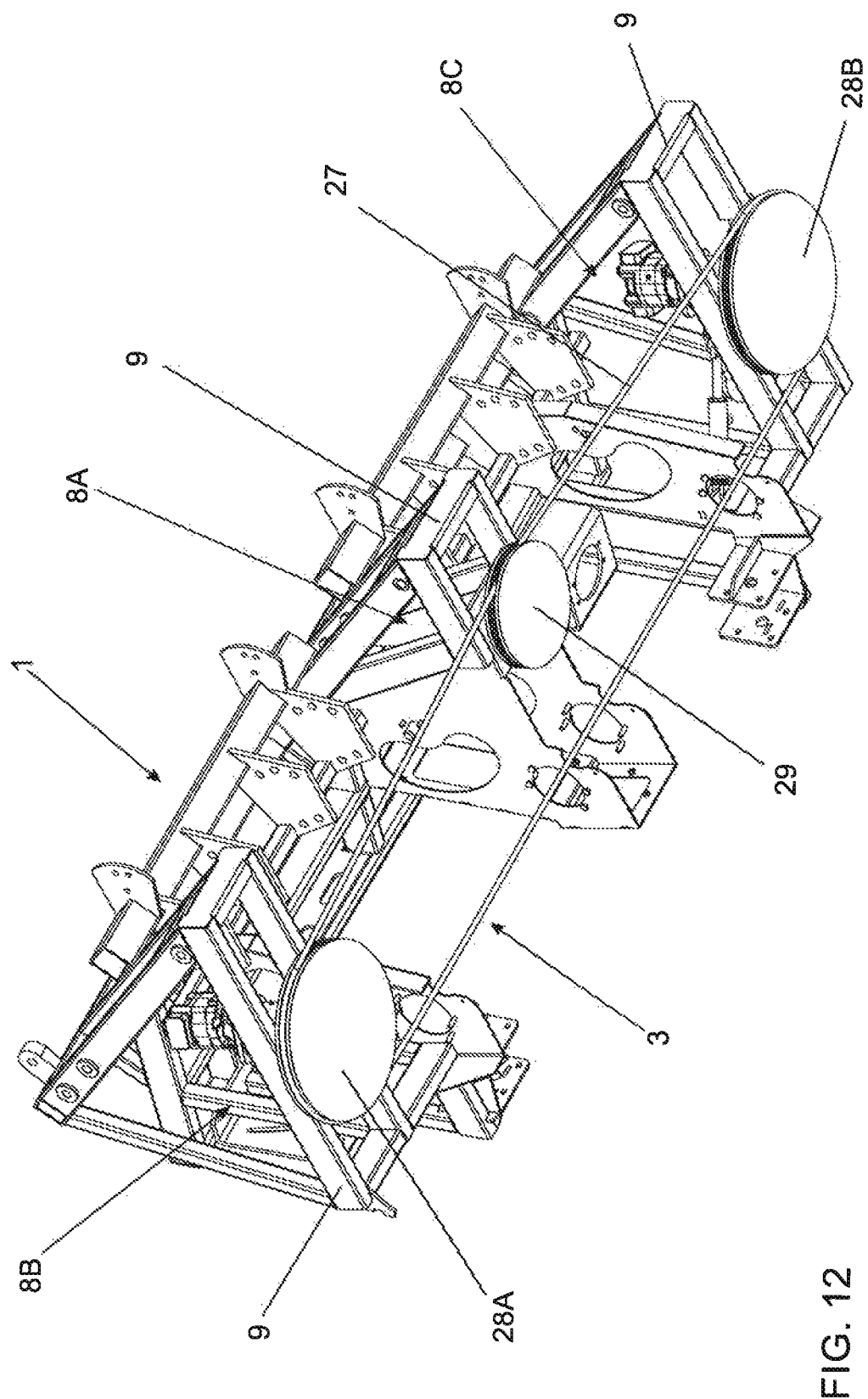
FIG. 12 shows another perspective view just of the modular structure with the wire cutting set, highlighting its assembly to the lower part of said modular structure.

The mouth structure (2), as shown in FIGS. 7 and 8, is formed by a crossbeam (16) equally reinforced in the middle by other reinforcement plates (17C) including another short tube, also configuring a hinged coupling point (17D) in axial alignment with the rear one (17B) to receive a hinged joining pin (18) between the modular structure (1) and the mouth structure (2). The crossbeam (16) also includes vertical tubes (19), a pair on each side, and a lower tube (20), forming a frame with other four tubes horizontally projected behind (21), having the free edges interlinked by other vertical tubes (22) and an upper horizontal tube (23), forming two side panels (24) which, on their top, have sustaining hooks (25A) and, on the bottom, beside each panel (24), engaging points (25B) and side "U"-shaped supports (26A) with tears (26B). The tears (26B) form fixing points and an angle movement limit between the modular structure (1) and the mouth structure (2). The set is positioned and coupled to a usual tractor or self-propeller by means of sustaining hooks (25A) and engaging points (25B), highlighting the fact that the mouth structure (2) is fixed, while the modular structure (1) is liable to swing as a pendulum, i.e., it may balance by raising and lowering its side edges according to an angle limited by the "U"-shaped supports (26A) and respective tears (26B), thus allowing the set to follow the slopes of the soil and the tractor or self-propeller itself, and the cutting front is consequently always kept parallel to the soil.

The cutting wire device (3) is shown in detail in FIGS. 9 to 12. It comprises a continuous cutting wire (27) (steel wire rope), extending throughout the width of the modular structure (1) and located between at least two traction pulleys (28A) and (28B), one on each side, and a third tensioning pulley (29). All the pulleys are located parallel to and below the lower horizontal assembly plane (L1) and the respective structural cases (8A), (8B) and (8C) of the modular structure (1). The intermediate tensioning pulley (29) has a rolling hub (30) duly assembled on a support (31) fixed to the rectangular frame (9) of the middle structural case (8A).

The traction pulleys (28A) and (28B) are equally assembled over rolling hubs (32) with the respective hydraulic engines (33), and the pulley (28A) is fixedly assembled to the corresponding support formed by the rectangular frame (9) of the compartment (8B).

The traction pulley (28B) is assembled to reciprocate with a single alternate movement, to keep the tension of the continuous cutting wire (27). Its rolling hub (32) is fixed to the edge of an "L"-shaped swing arm (34), which other edge is radially fixed to a rolling bearing (35) which, in turn, is located over a support (36) fixed to inside the frame (9) of the left structural case (8C) of the modular structure (1), including a hydraulic damper (37) which edges are hinged, respectively, to said "L"-shaped support (34) and to said modular structure (1). Under this condition, the continuous cutting wire (27) may suffer impacts which are neutralized by the floating effect of the traction pulley (28B) and the respective hydraulic damper (37).

Figure 13:
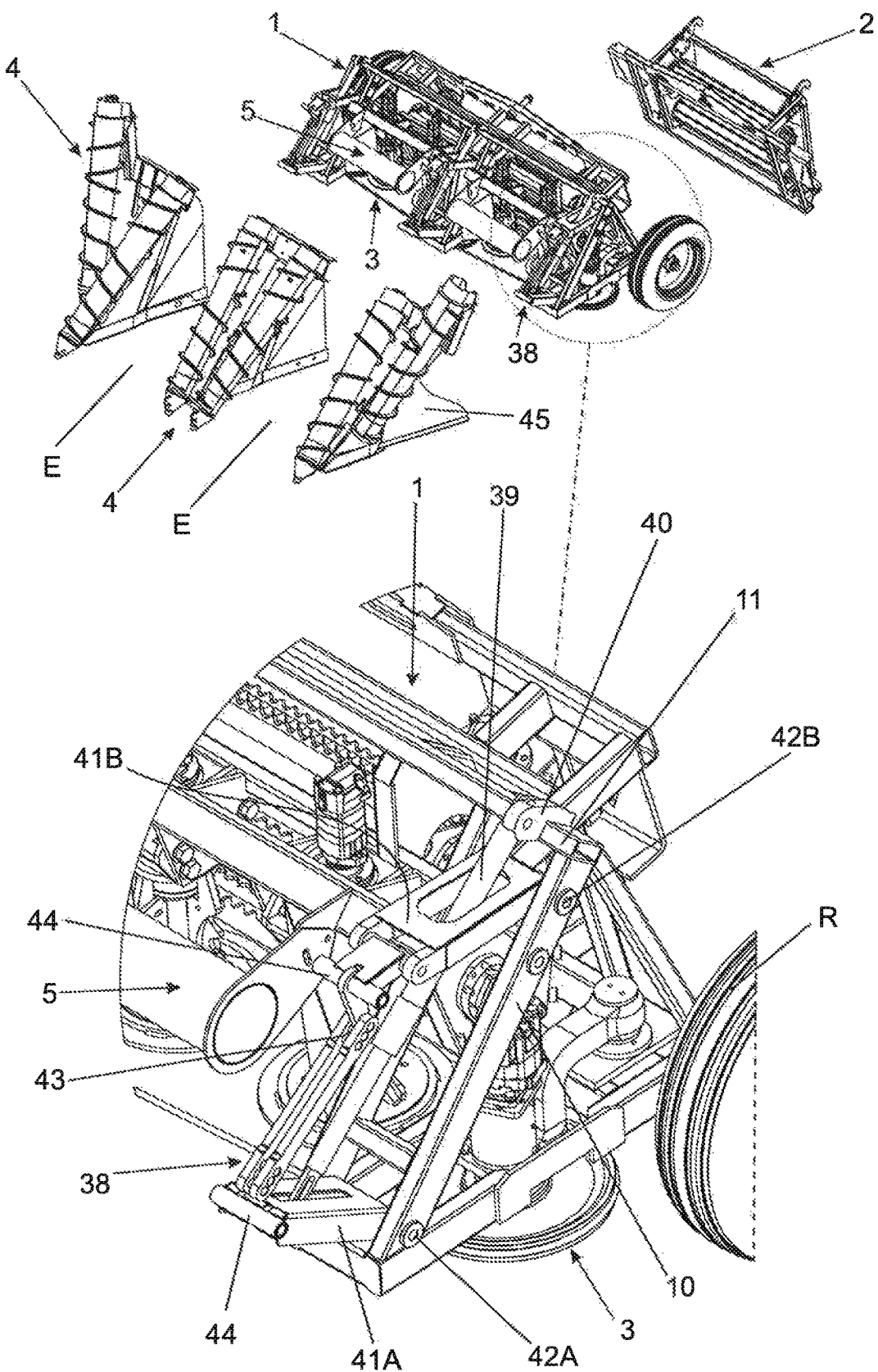
FIG. 13 shows a partially exploded perspective view from a front upper angle and an enlarged detail from the same perspective, highlighting the arrangement of usual lane dividers for plants to be cut.
Figure 14:
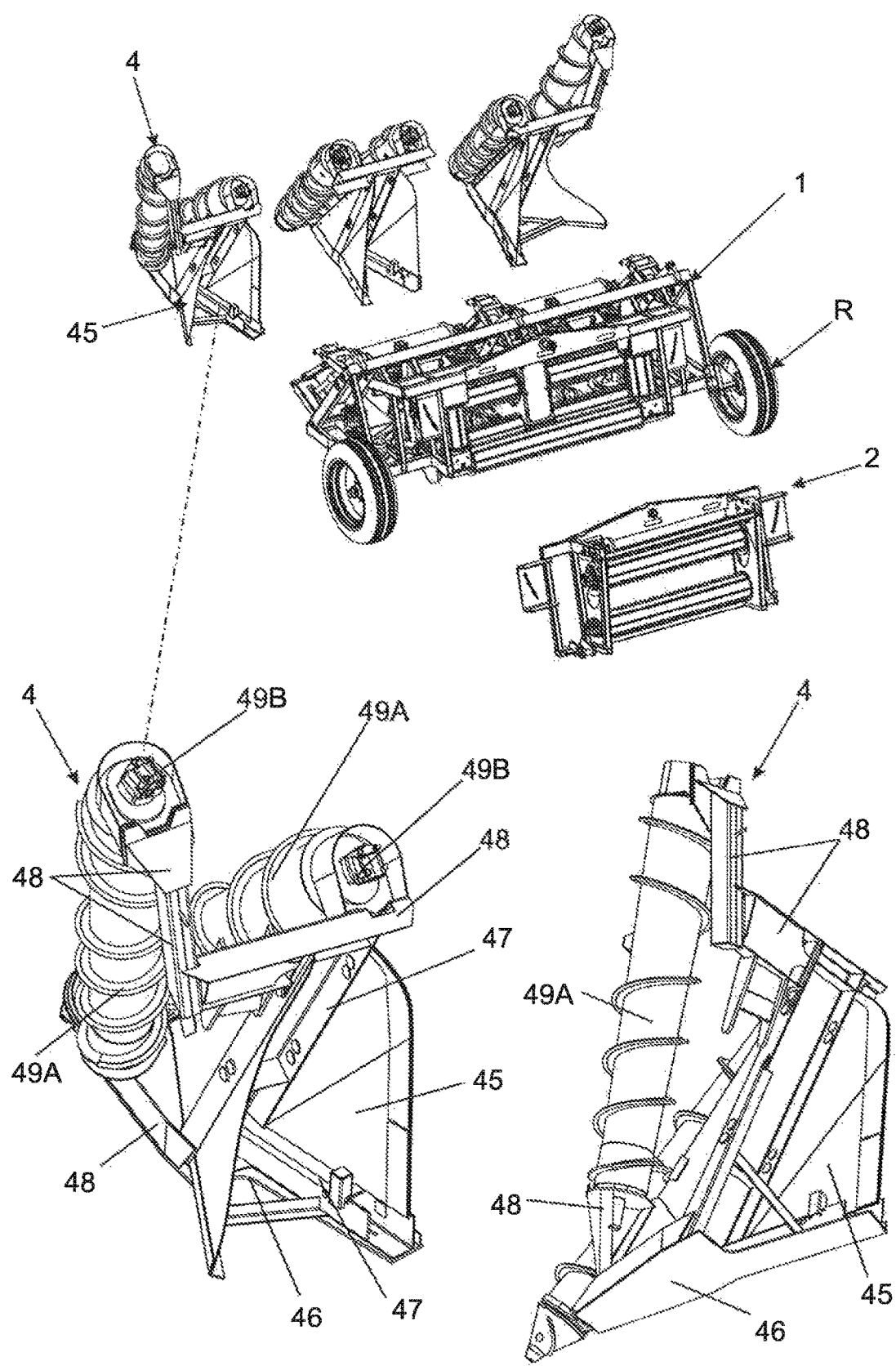
FIG. 14 also shows a partially exploded perspective view, just like the previous one, but from a rear upper angle, showing other embodiment details for the usual lane dividers for plants to be cut.

The usual lane dividers (4) are shown in detail in FIGS. 13 and 14, wherein each one of them has a pantographic support (38) including a hydraulic cylinder (39), with its upper edge hinged (40) to the crossbeam (11) of the modular structure (1), while its lower edge is hinged to the middle part of a support in the form of a rectangular plate (41A), which rear edge is hinged (42A) between the sloped parts of the rectangular frame (10) of the modular structure (1). The pantographic support includes another support in the form of a rectangular plate (41B) similar to the first one which, besides being freely crossed by the hydraulic cylinder (39), also has its rear edges hinged (42B) to the upper edge of the rectangular frame (10) of the modular structure (1).

Both supports in the form of rectangular plates (41A and 41B) have their front edges interlinked by a hinged arm (43), also defining two hinged points (44) at the edges of said plates (41A and 41B), where they form hinged couplings for the respective parts of a laid down "V"-plate body (45) which sloped apex is turned frontwards and includes a lower sliding side (46) combined with an internal structure (47) and different external supports (48). The external supports (48) form the assembly means for a pair of usual rotating lane-opener cylinders (49A) activated by the respective hydraulic engines (49B) turning in opposite directions, so that the canes from the lane to be cut may be guided towards the corresponding inlet space (E) between said lane dividers (4).

Figure 15:
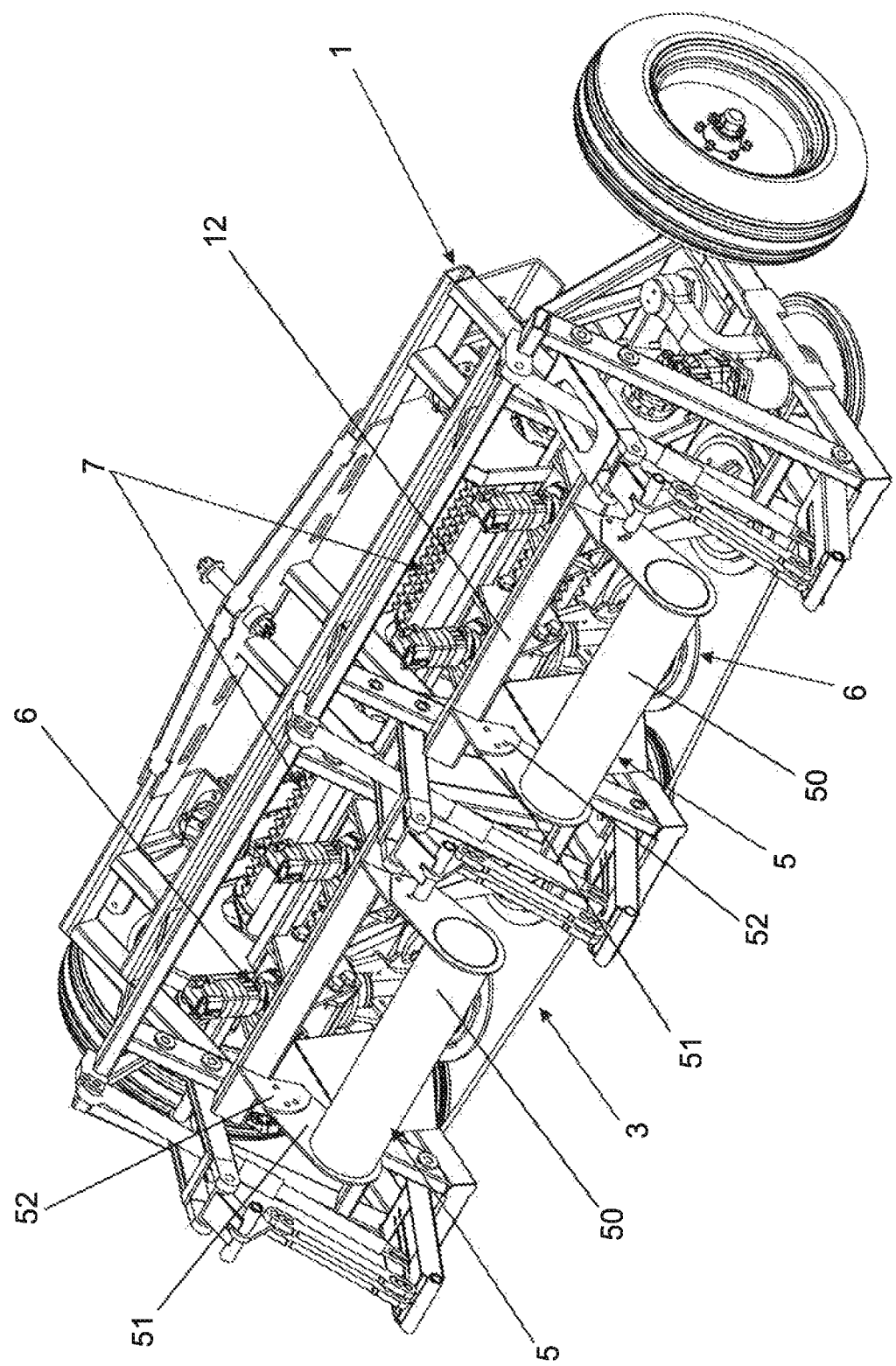
FIG. 15 is a perspective view of the platform as partially disassembled, highlighting the guiding sets tilting the plants before and after their cutting.

FIG. 15 shows the details of the guiding sets (5), each one formed by a horizontal tube (50), which edges are fixed to adjustable radial supports (51) opposed to each other over other radial supports (52) in existence over the crossbeam (12) of the modular structure (1), cooperating to regulate the height and position of said tubes (50) above and before the pulleys of the cutting wire device (3) so that both tubes (50) may form a barrier and push the plants over a given slope before the cutting operation, thus facilitating tumbling and alignment of said cut plants towards vertical pulling sets (6) and horizontal pulling sets (7).

Figure 16:
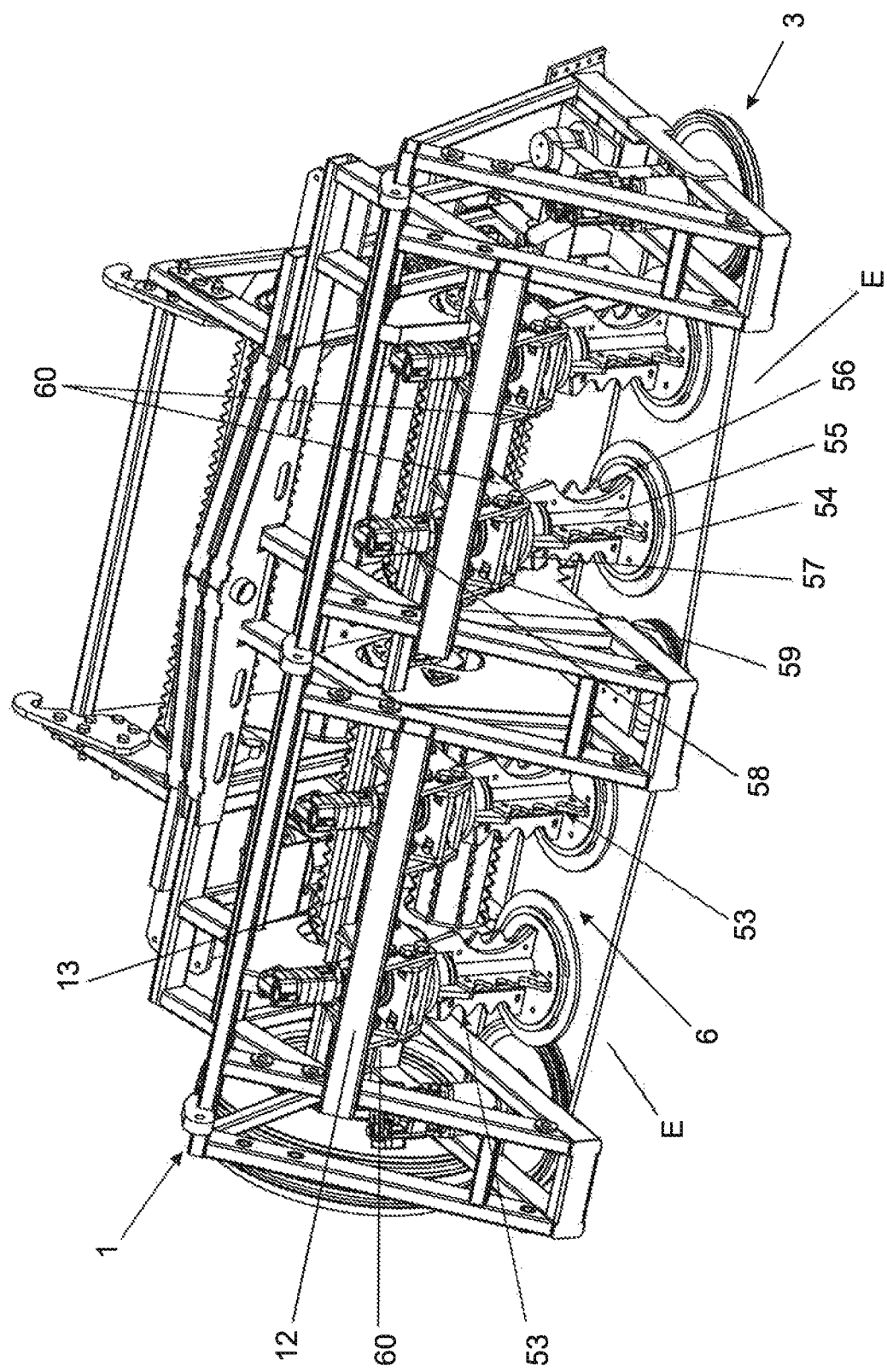
FIG. 16 shows a perspective view of the platform as partially assembled, highlighting the assembly of the set of vertical pullers for cut canes.
Figure 17:
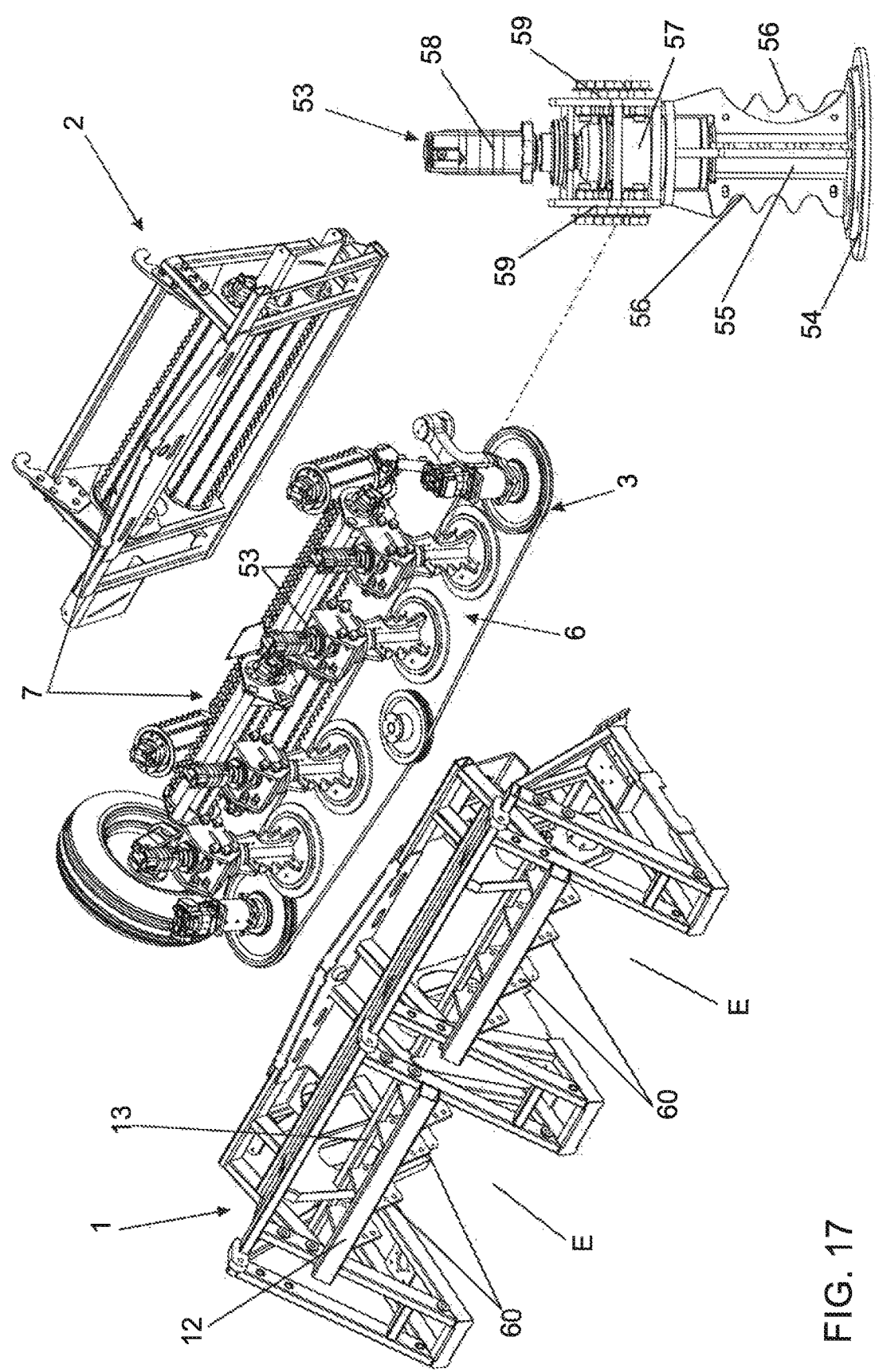
FIG. 17 shows an exploded perspective view of the previous view, also highlighting the assembly of the vertical traction set of cut canes.

The vertical pulling set (6) is shown in detail in FIGS. 16 and 17. The vertical pulling set (6) comprises four rotating units (53), two for each lane and vertically positioned on the side limits of each inlet spacing (E). Each rotating unit (53) is formed by a lower disc (54) positioned in parallel, near and above the cutting wire device (3), where it is centered and solidary to the lower edge of a vertical axis (55) provided with radial jaws in the form of a toothed ruler (56) extending throughout the height of said vertical axis (55), which upper edge is coupled to a bearing (57) interlinked to an upper hydraulic engine (58). Said bearing also includes side plate supports (59) for fixing said set to other plate supports (60) which are welded and distributed between the beams (12) and (13) of the modular structure (1).

Rotating units (53) for each inlet space (E) turn in opposite directions to align and guide cut canes inside the inlet space (E). The discs (54) force the canes to the center of the inlet space (E) and, at the same time, toothed rulers (56) work as jaws displacing the plants behind towards horizontal pulling sets (7).

Figure 18:
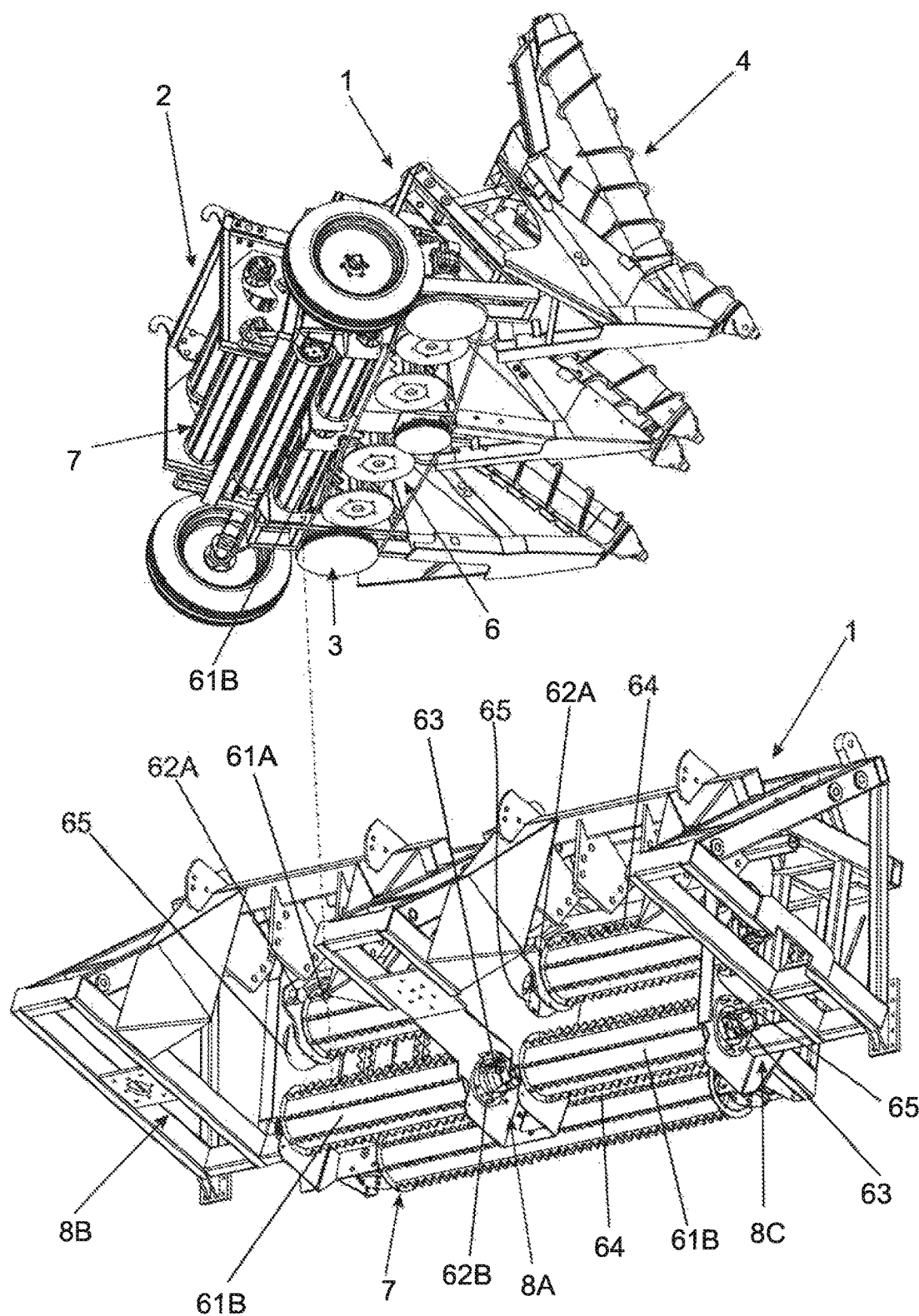
FIG. 18 is a perspective view and a magnified detail of the structure, highlighting the first group of rollers of the horizontal pulling devices for the cut canes.
Figure 19:
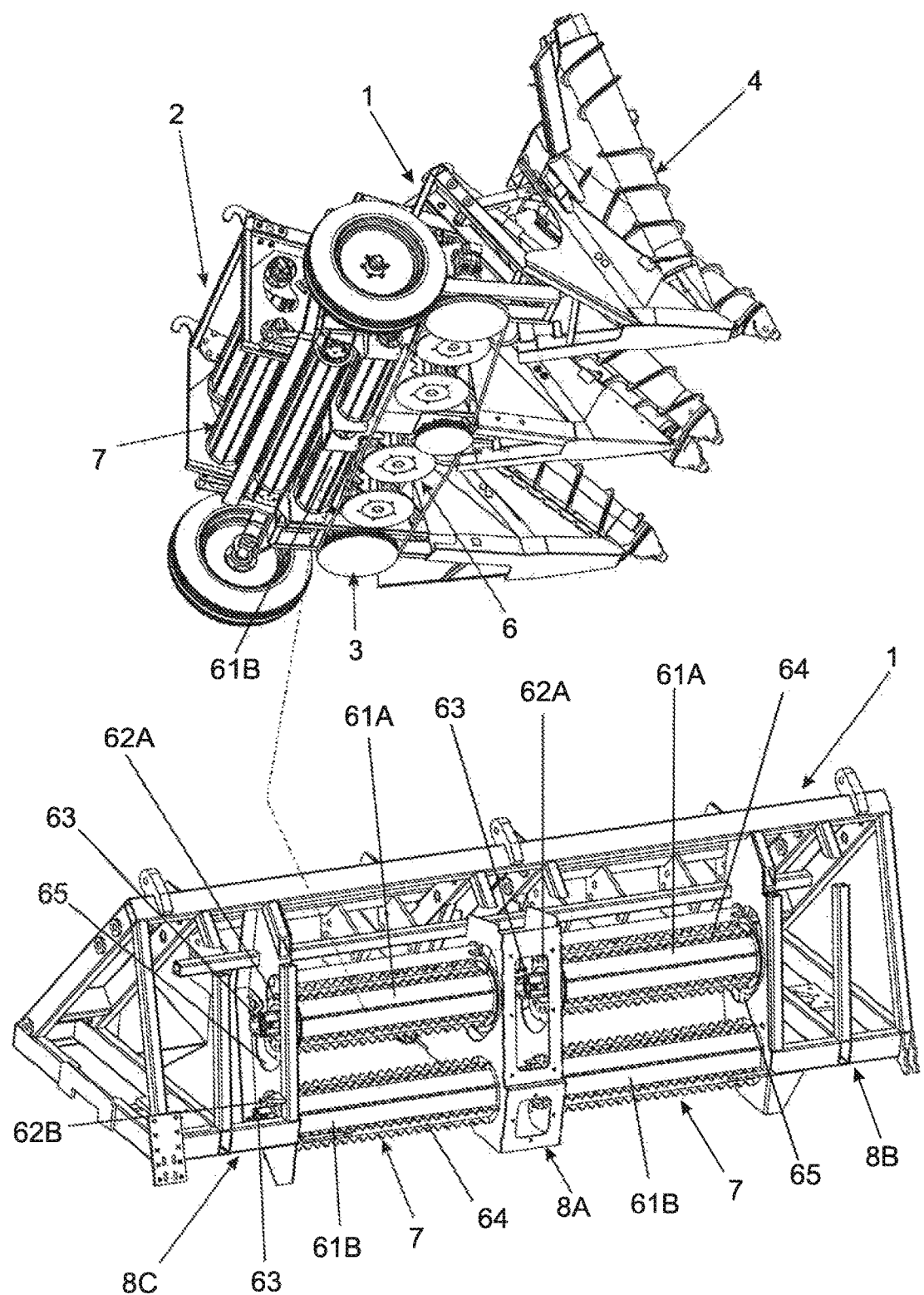
FIG. 19 is the same as above, but from a different angle, also highlighting the first group of rollers of the vertical pulling devices for cut canes.

Horizontal pulling sets (7) are shown in FIGS. 18 and 19. The horizontal pulling sets (7) comprise a first group of four pulling rollers, axially aligned in pairs, with a pair of upper pulling rollers (61A) and a pair of lower pulling rollers (61B) respecting the height limit of the vertical pulling set (6). Said upper pulling rollers (61A) and lower pulling rollers (61B) have, at their edges, bearings (62A-62B) and their respective hydraulic engines (63) are assembled to the side walls of plates of the respective structural cases (8A), (8B) and (8C). All pulling rollers (61A) and (61B) are equally provided with lengthwise jaws in the form of toothed rulers (64).

The pair of upper pulling rollers (61A) is floating and, for that purpose, their bearings (62A) are slidably located in oblong tears (65) cooperating for the set to be freely and automatically displaced up and down, defining self-regulation for passage according to the volume of cane pulled between said pulling rollers (61A) and (61B).

Figure 20:
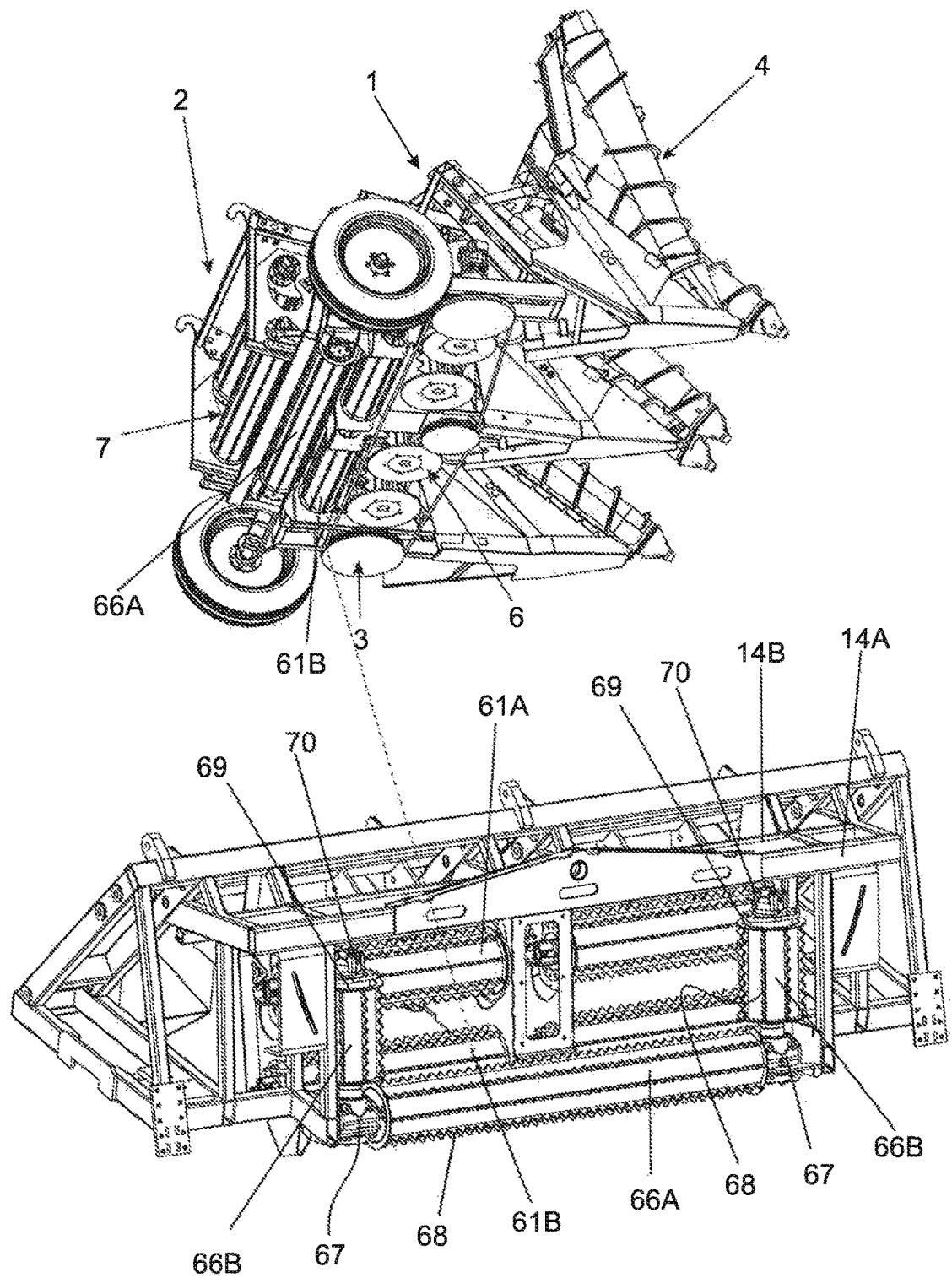
FIG. 20 is a perspective view and a magnified detail of the structure, highlighting the second group of rollers of the pulling devices for the cut canes.

Concerning FIG. 20, an integral part of the horizontal pulling sets (7) is a second group of three pulling rollers, a horizontal pulling roller (66A) and two vertical pulling rollers (66B), coupled to each other by means of transmission cases at 90° (67). All three pulling rollers are equally provided with lengthwise jaws in the form of toothed rulers (68), wherein the horizontal pulling roller (66A) is aligned just behind the lower pair of pulling rollers (61B), combining with it in its length, while the other two vertical pulling rollers (66B) are positioned at the limits of the edges of said pairs of pulling rollers (61A) and (61B).

Vertical pulling rollers (66B) have their edges with the respective bearings (69) and hydraulic engines (70) fixed to the modular structure (1) and below the crossbeams (14A) and (14B).

Figure 21:
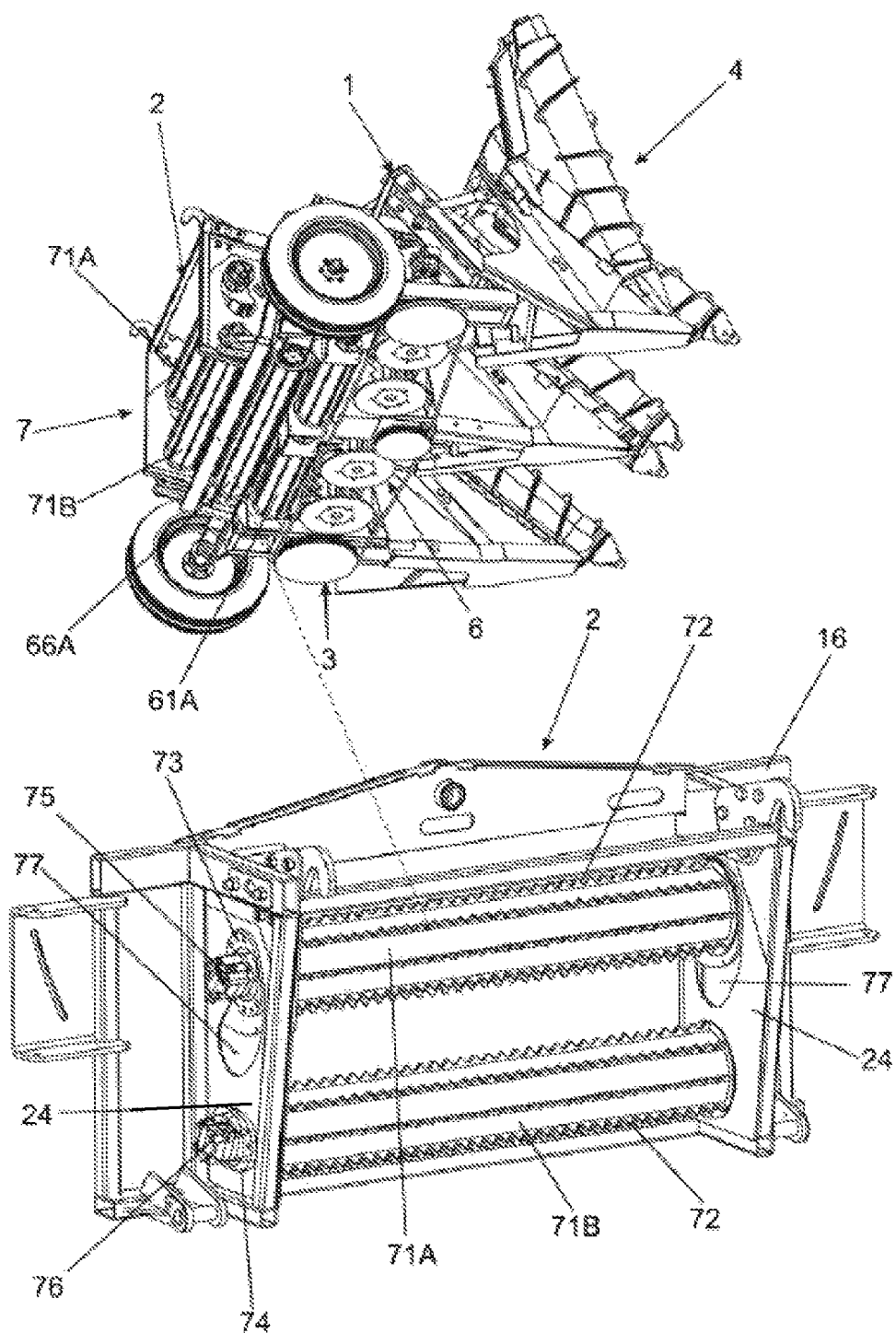
FIG. 21 is a perspective view and a magnified detail of the structure, highlighting the third group of rollers of the pulling devices for the cut canes.
Figure 22:
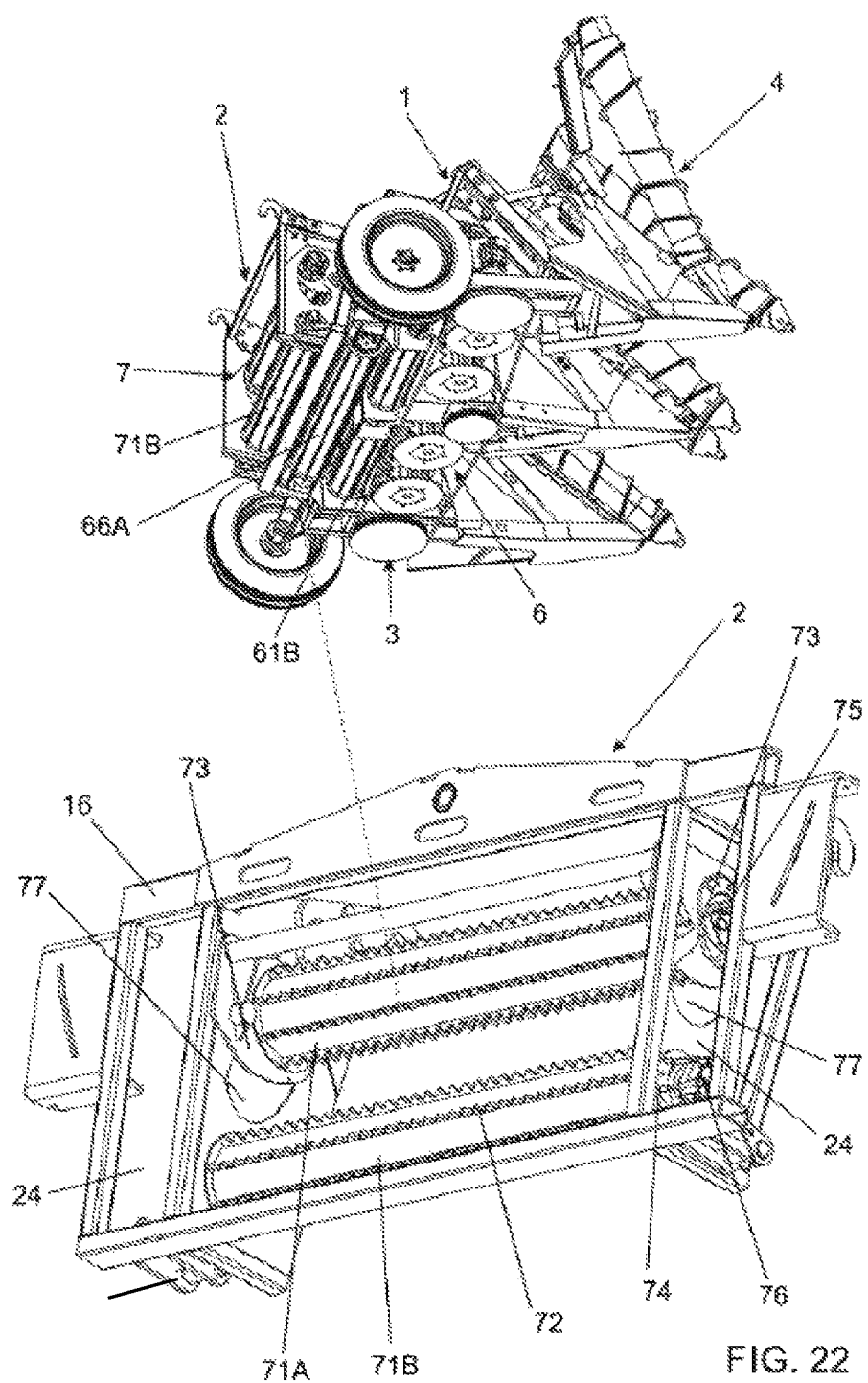
FIG. 22 is the same as above, but from a different angle, also highlighting the third group of rollers of the horizontal pulling devices for cut canes.

By observing FIGS. 21 and 22, horizontal pulling sets (7) are formed by a third group of two horizontal and parallel pulling rollers, being one upper floating pulling roller (71A) and a lower fixed pulling roller (71B) that are positioned one above the other r and aligned with the pulling rollers (61A), (61B) and (66A). Just like the previous rollers, the horizontal parallel pulling rollers are equally provided with lengthwise jaws in the form of toothed rulers (72), having their edges with the respective bearings (73) and (74) integrated with hydraulic engines (75) and (76), wherein the bearings (74) are fixed to the side panels (24) of the mouth structure (2) and, on those same side panels (24), bearings are slidably assembled in oblong tears (77) to allow the upper floating pulling roller (71A) to self-adjust itself upwards and downwards according to the volume of cane passing through the cutting platform.

Vertical (6) and horizontal (7) pulling sets together form a true tunnel with a rectangular section and variable height, wherein the plants are pulled towards the back. From that point, if the set is assembled over a usual tractor, cut canes are thrown onto the soil and organized in rows, to be collected later, but, if the set is assembled over a self-propeller, it directly receives canes from the platform and begins a complementary process which, despite being able to vary, performs at least two further steps: chopping and cleaning, transforming canes into leaf-free billets to then accumulate them for transshipment or for any transport vessel.

As stated, the platform at issue has been built to simultaneously cut two lanes of plants, but, keeping the same embodiment concept, it is possible to manufacture platforms with a larger number of modules. The sizing of the structure (1) can be changed by increasing its modular parts to assemble a larger wiring cut device and increasing the number of other devices, which is a significant advantage for the process for manufacturing the set.

The invention claimed is:

1. A modular platform for harvesting sugar cane plants, comprising:
   (A) a triangle-shaped modular structure having:
      a lower horizontal assembly plane;
      a sloped rear assembly plane;
      a sloped front assembly plane;
      two external sides adjacent to the sloped rear assembly plane; and
      a wheel assembled on each of the two external sides;
      wherein the modular structure is constructed and arranged to be coupled to a tractor or a self-propelled automotive machine;
   (B) a mouth structure attached and hinged to the sloped rear assembly plane of the modular structure, wherein the mouth structure has a coupler to allow the platform to be connected fixedly to corresponding parts of the tractor or to the self-propelled automotive machine; and
      wherein the mouth structure allows the modular structure to create a pendulum movement;
   (C) a continuous cutting wire device mounted under the lower horizontal assembly plane of the modular structure, the cutting wire device having a continuous steel cable cutting wire assembled to form a horizontal cutting line extending across a width of the modular structure, and at least two parallel traction pulleys, the pulleys constructed and arranged to move the cutting wire to cut the plants at a base portion;
   (D) multiple lane dividers mounted on the sloped front assembly plane, wherein each of the multiple lane dividers comprises rotating helical rollers that are constructed and arranged to separate interlaced sugar cane plants between adjoining lanes to be harvested; and
      wherein the plants from each of the lanes are guided by guiding sets towards inlet gaps located between the multiple lane dividers, allowing the plants to be sloped forwardly for harvesting;
   (E) a vertical pulling set comprising at least two rotating units for each of the lanes, wherein each of the at least two rotating units is vertically positioned on a left or right side of each of the inlet gaps; and
      wherein each of the at least two rotating units has toothed rulers and is formed by a lower disc positioned parallel to and above the cutting wire device; and
   (F) a horizontal pulling set having at least a pair of upper pulling rollers and a pair of lower pulling rollers axially aligned in pairs, with each pulling roller having toothed rulers;
   wherein the vertical and horizontal pulling sets are constructed and arranged to direct and pull the harvested plants inside the modular platform, and move the plants behind the modular platform in rows; and
   wherein all moving parts of the modular platform are activated by hydraulic pumps and the modular platform is able to balance by raising and lowering the modular structure; and
   wherein the modular platform is constructed and arranged to form a harvesting cutting front for sugar cane plants with the balance of the modular structure shifting to keep the cutting front parallel to the ground.

2. The modular platform according to claim 1, wherein the modular structure further comprises:
   an intermediate structural case;
   a right structural case; and
   a left structural case;
   wherein each of the structural cases has a triangular prism shape with rectangular frames that form the sloped sides of the prism as well as the bases, which also form the lower horizontal assembly plane; and wherein the rear assembly plane and the front assembly plane are joined at upper edges by a top crossbar, forming an apex of the modular structure, with two segmented crossbar-shaped links below the top crossbar configuring fixing points for a rear structural extension; and wherein the rear structural extension has two parallel beams linked by perpendicular supports behind the top crossbar; and wherein the middle of the parallel beams are interleaved between a first set of reinforcement plates through which a first short central tube passes, configuring a first hinged coupling point with the mouth structure.

3. The modular platform according to claim 1, wherein the mouth structure comprises:
   a frame that further comprises:
      a crossbeam, having a right and left end and reinforced in the middle by a second set of reinforcement plates through which a second short central tube passes, configuring a second hinged coupling point in axial alignment with the first hinged coupling point;
      a lower horizontal tube;
      a right inner vertical tube and a right outer vertical tube, both of which extend downward from the right end of the crossbeam toward the lower horizontal tube; and
      a left inner vertical tube and a left outer vertical tube, both of which extend downward from the left end of the crossbeam toward the lower horizontal tube;
   a right side panel formed by the right inner vertical tube, two horizontal tubes that extend rearward, one from a top end of the right inner vertical tube and one from a bottom end of the right inner vertical tube, and a first vertical connecting tube that connects the ends of the horizontal tubes that extend rearward from the top and bottom ends of the right inner vertical tube;
   a left side panel formed by the left inner vertical tube, two additional horizontal tubes that extend rearward, one from a top end of the left inner vertical tube, and one from a bottom end of the left inner vertical tube, and a second vertical connecting tube that connects the ends of the horizontal tubes that extend rearward from the top and bottom ends of the left inner vertical tube;
   an upper horizontal tube that connects the horizontal tubes that extend rearward from the top ends of the right and left inner vertical tubes;
   a sustaining hook at the top of each side panel;
   a right engaging point attached to the lower horizontal beam, in between the right inner vertical tube and the right outer vertical tube;
   a left engaging point attached to the lower horizontal beam, in between the left inner vertical tube and the left outer vertical tube; and
   a side U-shaped support extending from each of the right and left outer vertical tubes, with tears forming fixing points and an angle movement limit between the modular structure and the mouth structure; and
wherein the mouth structure is connected to the modular structure by a hinged joining pin that extends from the modular structure to the mouth structure.

4. The modular platform according to claim 1, wherein the cutting wire device extends between the at least two traction pulleys and comprises:
   a right traction pulley;
   a left traction pulley; and
   an intermediate tensioning pulley located centrally on one side of the cutting wire; and
   wherein each of the traction pulleys is parallel to and below the lower horizontal assembly plane; and
   wherein the right traction pulley is below the right structural case, the left traction pulley is below the left structural case, and the intermediate tensioning pulley is located below the intermediate structural case of the modular structure; and
   wherein each of the traction pulleys is attached to a rolling hub, the intermediate tensioning pulley rolling hub being assembled over a first support fixed to the rectangular frame of the intermediate structural case, and the left and right traction pulleys being assembled over rolling hubs with each of the rolling hubs attached to hydraulic engines; and
   wherein the right traction pulley is fixed to the right structural case; and
   wherein the left traction pulley and corresponding rolling hub are fixed to a first edge of an L-shaped swing arm, and a second edge of the L-shaped swing is radially fixed to a rolling bearing located on a second support attached to the rectangular frame of the left structural case, with a hydraulic damper hinged at the edges to both the L-shaped swing arm and to the modular structure.

5. The modular platform according to claim 1, wherein each of the lane dividers further comprises:
   a pair of lane opener rotating cylinders activated by a pair of hydraulic engines turning in opposite directions, the lane openers each having a pantographic support with a hydraulic cylinder;
   wherein the hydraulic cylinder has an upper edge hinged to the top crossbar of the modular structure and a lower edge hinged to a middle of a first rectangular plate-shaped support having a rear edge hinged at the front bottom edge of the left, intermediate or right structural case of the modular structure; and the lane openers have a second rectangular plate-shaped support freely crossed by the hydraulic cylinder, with its rear edges hinged to an upper edge of the left, intermediate or right structural case; and
   wherein the first and second rectangular plate-shaped supports have front edges interconnected by a hinged arm connecting two hinged points at the edges of the first and second plate-shaped supports, forming hinged couplings for a lying V-shaped plate body having a sloped frontward-facing apex and a lower sliding side combined with an internal structure and external supports, with the external supports forming assembling means for the pair of lane opener rotating cylinders.

6. The modular platform according to claim 1, wherein each of the guiding sets further comprises a horizontal tube, with each end fixed to an adjustable radial support located opposite to one another and attached to additional radial supports located on the segmented crossbar-shaped links of the modular structure; and
   wherein the adjustable radial support enables the adjustment of the height and positioning of the horizontal tubes above and front of the pulleys of the cutting wire device.

7. The modular platform according to claim 1, wherein the vertical pulling set comprises four rotating units, with two rotating units corresponding to each of the lanes; and
   wherein each of the rotating units is vertically positioned on the left or right side of each of the inlet gaps, with the lower disc positioned parallel to and above the cutting wire device, and each rotating unit further comprises a vertical axis with toothed rulers extending along the length of the vertical axis; and wherein the lower edge of the vertical axis is attached to the center of the lower disc and the upper edge of the vertical axis is coupled to a bearing interlinked with an upper hydraulic engine and having two side plate supports for fixing the vertical pulling set to other plate supports welded and distributed along the segmented cross-bar shaped links of the modular structure.

8. The modular platform according to claim 1, wherein the horizontal pulling sets further comprise:

a first group of four pulling rollers axially aligned in pairs, including a pair of upper pulling rollers and a pair of lower pulling rollers, wherein each of the upper pulling rollers and the lower pulling rollers have, at their edges, bearings and hydraulic engines assembled to plates at the side of the respective intermediate, right, and left structural cases and all four pulling rollers have lengthwise jaws comprised of equally distributed toothed rulers; and wherein the pair of upper pulling rollers are floating and having their bearings slidably located in oblong tears;

a second group of three pulling rollers, comprised of a horizontal pulling roller and two vertical pulling rollers coupled to each other at 90° angles by transmission cases, with each of the three pulling rollers having lengthwise jaws comprised of equally distributed toothed rulers and the vertical pulling rollers having edges, bearings and hydraulic engines fixed to the modular structure below the parallel beams;

wherein the horizontal pulling roller is aligned behind the pair of lower pulling rollers of the first group, and the two vertical pulling rollers are in line with the edges of the four pulling rollers of the first; and a third group of two parallel horizontal pulling rollers having an upper floating pulling roller and a lower fixed pulling roller, wherein the upper and lower pulling rollers are both and aligned with the upper and lower pulling rollers of the first group;

wherein each parallel horizontal pulling roller has lengthwise jaws comprised of equally distributed toothed rulers, and has edges and bearings integrated with hydraulic engines; and wherein the bearings are fixed to the side panels of the mouth structure and are floating and slidably assembled in oblong tears.

* * * * *